United States Patent
Côté et al.

(10) Patent No.: US 11,277,420 B2
(45) Date of Patent: Mar. 15, 2022

(54) SYSTEMS AND METHODS TO DETECT ABNORMAL BEHAVIOR IN NETWORKS

(71) Applicant: Ciena Corporation, Hanover, MD (US)

(72) Inventors: David Côté, Gatineau (CA); Merlin Davies, Montréal (CA); Olivier Simard, Montréal (CA); Emil Janulewicz, Ottawa (CA); Thomas Triplet, Manotick (CA)

(73) Assignee: Ciena Corporation, Hanover, MD (US)

( * ) Notice: Subject to any disclaimer, the term of this patent is extended or adjusted under 35 U.S.C. 154(b) by 339 days.

(21) Appl. No.: 15/896,380

(22) Filed: Feb. 14, 2018

(65) Prior Publication Data
US 2018/0248905 A1    Aug. 30, 2018

Related U.S. Application Data

(60) Provisional application No. 62/463,060, filed on Feb. 24, 2017.

(51) Int. Cl.
| H04L 29/06 | (2006.01) |
| H04L 43/045 | (2022.01) |

(Continued)

(52) U.S. Cl.
CPC .......... *H04L 63/1425* (2013.01); *G06F 15/76* (2013.01); *G06F 17/18* (2013.01); *G06K 9/627* (2013.01); *G06K 9/6269* (2013.01); *G06N 3/08* (2013.01); *G06N 5/003* (2013.01); *G06N 20/00* (2019.01); *G06N 20/10* (2019.01);

(Continued)

(58) Field of Classification Search
CPC ............. H04L 63/1425; H04L 41/0677; H04L 41/145; H04L 43/045; H04L 63/1441; G06N 20/20; G06N 20/00; G06N 20/10; G06N 3/08; G06N 5/003; G06N 3/02; G06N 5/04; G06F 15/76; G06F 17/18; G06K 9/6269; G06K 9/627
See application file for complete search history.

(56) References Cited

U.S. PATENT DOCUMENTS

| 5,774,357 A | * | 6/1998 | Hoffberg | ............... G06F 3/0482 713/600 |
| 7,539,907 B1 | | 5/2009 | Johnsen et al. | |

(Continued)

OTHER PUBLICATIONS

Imamverdiyev, Yadigar; Sukhostat, Lyudmila. Anomaly detection in network traffic using extreme learning machine. Anomaly detection in network traffic using extreme learning machine. https://ieeexplore.ieee.org/stamp/stamp.jsp?tp=&arnumber=7991732 (Year: 2016).*

(Continued)

*Primary Examiner* — Jeremiah L Avery
(74) *Attorney, Agent, or Firm* — Clements Bernard Baratta; Lawrence A. Baratta, Jr.; Christopher L. Bernard

(57) ABSTRACT

Systems and methods implemented by a computer to detect abnormal behavior in a network include obtaining Performance Monitoring (PM) data including one or more of production PM data, lab PM data, and simulated PM data; determining a model based on machine learning training with the PM data; receiving live PM data from the network; utilizing the live PM data with the model to detect an anomaly in the network; and causing an action to address the anomaly.

20 Claims, 13 Drawing Sheets

(51) Int. Cl.
  *H04L 41/14* (2022.01)
  *G06F 17/18* (2006.01)
  *G06K 9/62* (2022.01)
  *G06N 20/00* (2019.01)
  *H04L 41/0677* (2022.01)
  *G06F 15/76* (2006.01)
  *G06N 3/08* (2006.01)
  *G06N 5/00* (2006.01)
  *G06N 20/20* (2019.01)
  *G06N 20/10* (2019.01)
  *G06N 3/02* (2006.01)
  *G06N 5/04* (2006.01)

(52) U.S. Cl.
  CPC ........ *G06N 20/20* (2019.01); *H04L 41/0677* (2013.01); *H04L 41/145* (2013.01); *H04L 43/045* (2013.01); *H04L 63/1441* (2013.01); *G06N 3/02* (2013.01); *G06N 5/04* (2013.01)

(56) References Cited

U.S. PATENT DOCUMENTS

| | | | |
|---|---|---|---|
| 7,730,364 B2 | 6/2010 | Chang et al. | |
| 7,747,419 B2 | 6/2010 | Lin et al. | |
| 8,140,914 B2 | 3/2012 | Murphy et al. | |
| 8,762,298 B1* | 6/2014 | Ranjan | G06F 21/552 706/12 |
| 9,430,646 B1* | 8/2016 | Mushtaq | H04L 63/1425 |
| 2007/0152049 A1 | 7/2007 | Bar et al. | |
| 2012/0016607 A1 | 1/2012 | Cottrell et al. | |
| 2012/0173300 A1 | 7/2012 | Davenport et al. | |
| 2013/0332399 A1 | 12/2013 | Reddy et al. | |
| 2014/0098677 A1 | 4/2014 | Otung | |
| 2014/0157405 A1* | 6/2014 | Joll | H04L 63/1425 726/22 |
| 2014/0214745 A1 | 7/2014 | Walsh | |
| 2015/0128263 A1* | 5/2015 | Raugas | G06N 7/005 726/23 |
| 2015/0229661 A1* | 8/2015 | Balabine | G06F 21/554 726/22 |
| 2016/0191560 A1* | 6/2016 | Pegna | H04L 63/1425 726/23 |
| 2016/0330083 A1 | 11/2016 | Djukic et al. | |
| 2016/0342903 A1* | 11/2016 | Shumpert | G06F 11/079 |
| 2016/0359685 A1* | 12/2016 | Yadav | H04L 41/16 |
| 2016/0359695 A1* | 12/2016 | Yadav | H04L 43/04 |
| 2016/0359886 A1* | 12/2016 | Yadav | H04L 41/142 |
| 2017/0086208 A1 | 3/2017 | Cote et al. | |
| 2017/0295070 A1* | 10/2017 | Yang | H04L 43/04 |
| 2018/0018459 A1* | 1/2018 | Zhang | G06F 21/554 |
| 2018/0077178 A1* | 3/2018 | Beauchesne | H04L 63/1416 |
| 2018/0212819 A1* | 7/2018 | Zhang | H04L 41/0686 |
| 2019/0188212 A1* | 6/2019 | Miller | G06N 7/005 |
| 2019/0261204 A1* | 8/2019 | Wu | G06N 7/005 |

OTHER PUBLICATIONS

Zhang, Weiyu et al. A Survey of Anomaly Detection Methods in Networks. 2009 International Symposium on Computer Network and Multimedia Technology. https://ieeexplore.ieee.org/stamp/stamp.jsp?tp=&arnumber=5374676 (Year: 2009).*

* cited by examiner

SYSTEMS AND METHODS TO DETECT ABNORMAL BEHAVIOR IN NETWORKS

CROSS-REFERENCE TO RELATED APPLICATION(S)

The present application/patent claims priority to U.S. Provisional Patent Application No. 62/463,060, filed Feb. 24, 2017, and entitled "SYSTEMS AND METHODS TO DETECT ABNORMAL BEHAVIOR IN NETWORKS," the contents of which are incorporated by reference herein.

FIELD OF THE DISCLOSURE

The present disclosure generally relates to networking systems and methods. More particularly, the present disclosure relates to systems and methods to detect abnormal behavior in networks using supervised machine learning and using probability distributions derived from unlabeled multivariate data.

BACKGROUND OF THE DISCLOSURE

Conventionally, problem detection (i.e., anomaly detection) in networks is implemented after a failure has occurred. Specifically, following a failure or the like, an operator or technician would log into the system, perform a manual investigation, and remediation. Of course, this approach is reactive and typically involves a traffic hit, traffic loss, protection switching, etc. followed by network maintenance. Another approach to anomaly detection is to re-implement the failure scenario via a piece of software that can run and analyze in an offline manner. For a handful of Performance Monitoring (PM) metrics relating to the problem, alarms would be raised if any given PM crosses some pre-defined threshold. This is typically achieved using a rule-based engine with hard-coded if . . . else . . . statements specified by a human expert. Disadvantageously, with these conventional approaches, the reaction time is slow, engineering time is expensive, and experts are rare. Further, these approaches do not scale with large and complex networks. Also, these conventional approaches require a lot of expertise, work, and time to implement. Further, defining and updating complex if . . . else . . . rules are complicated and time-consuming, and there is limited accuracy if limited to simple rules such as 1-dimensional thresholding.

BRIEF SUMMARY OF THE DISCLOSURE

In an embodiment, a method implemented by a computer to detect abnormal behavior in a network includes obtaining Performance Monitoring (PM) data including one or more of production PM data, lab PM data, and simulated PM data; determining a model based on machine learning training with the PM data; receiving live PM data from the network; utilizing the live PM data with the model to detect an anomaly in the network; and causing an action to address the anomaly. The obtaining and the determining can be performed offline, and the receiving, the utilizing, and the causing can be performed in real-time with the live PM data. The live PM data and the PM data can be associated with any of an optical layer, a Time Division Multiplexing (TDM) layer, and a packet layer. The action can include one or more of a notification to a network operator, a replacement of a network device associated with the anomaly, and configuration changes of the network device associated with the anomaly. The PM data can be labeled prior to the training to differentiate between various root causes related to different anomalies.

The PM data can be labeled prior to the training to at least differentiate between normal PM data and anomalous PM data. The training can utilize the labeled PM data and supervised learning to build one or more classifiers to recognize the anomaly. The training can utilize the labeled PM data to build a plurality of classifiers with multiple intermediate classifiers and a final classifier as a combination of the multiple intermediate classifiers, and wherein the final classifier can be configured to recognize the anomaly and a type of the anomaly. The training can further include adjusting a threshold of the model to adjust precision and sensitivity of the model. The labeled PM data can utilize the simulated PM data with additional labels for a root cause of the anomaly. The training can utilize the labeled PM data and supervised machine learning to build one or more classifiers to recognize various root causes associated with each label.

The PM data can be unlabeled prior to the training, and the corresponding model provides a single probability output of the anomaly based on the live PM data. The PM data cam ne representative of a normally functioning network such that the single probability output provides an indication of a departure from the normally functioning network. The single probability output can be a p-value from multiple different PM types. The training can build a set of Probability Density Functions (PDFs) from the PM data, builds a likelihood function for each PDF, and builds a global likelihood function based on a product of each individual likelihood function, and wherein the global likelihood function can be a single multivariate function to describe a network component. The global likelihood function can be used to calculate a p-value and the anomaly is detected based on the p-value.

In another embodiment, an apparatus configured to detect abnormal behavior in a network includes a processor; and memory storing instructions that, when executed, cause the processor to obtain Performance Monitoring (PM) data including one or more of production PM data, lab PM data, and simulated PM data, determine a model based on machine learning training with the PM data, receive live PM data from the network, utilize the live PM data with the model to detect an anomaly in the network, and cause an action to address the anomaly. The live PM data and the PM data can be associated with any of an optical layer, a Time Division Multiplexing (TDM) layer, and a packet layer. The action can include one or more of a notification to a network operator, a replacement of a network device associated with the anomaly, and configuration changes of the network device associated with the anomaly.

In a further embodiment, a non-transitory computer-readable medium including instructions that, when executed, cause a processor to perform the steps of obtaining Performance Monitoring (PM) data including one or more of production PM data, lab PM data, and simulated PM data; determining a model based on machine learning training with the PM for; receiving live PM data from the network; utilizing the live PM data with the model to detect an anomaly in the network; and causing an action to address the anomaly.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
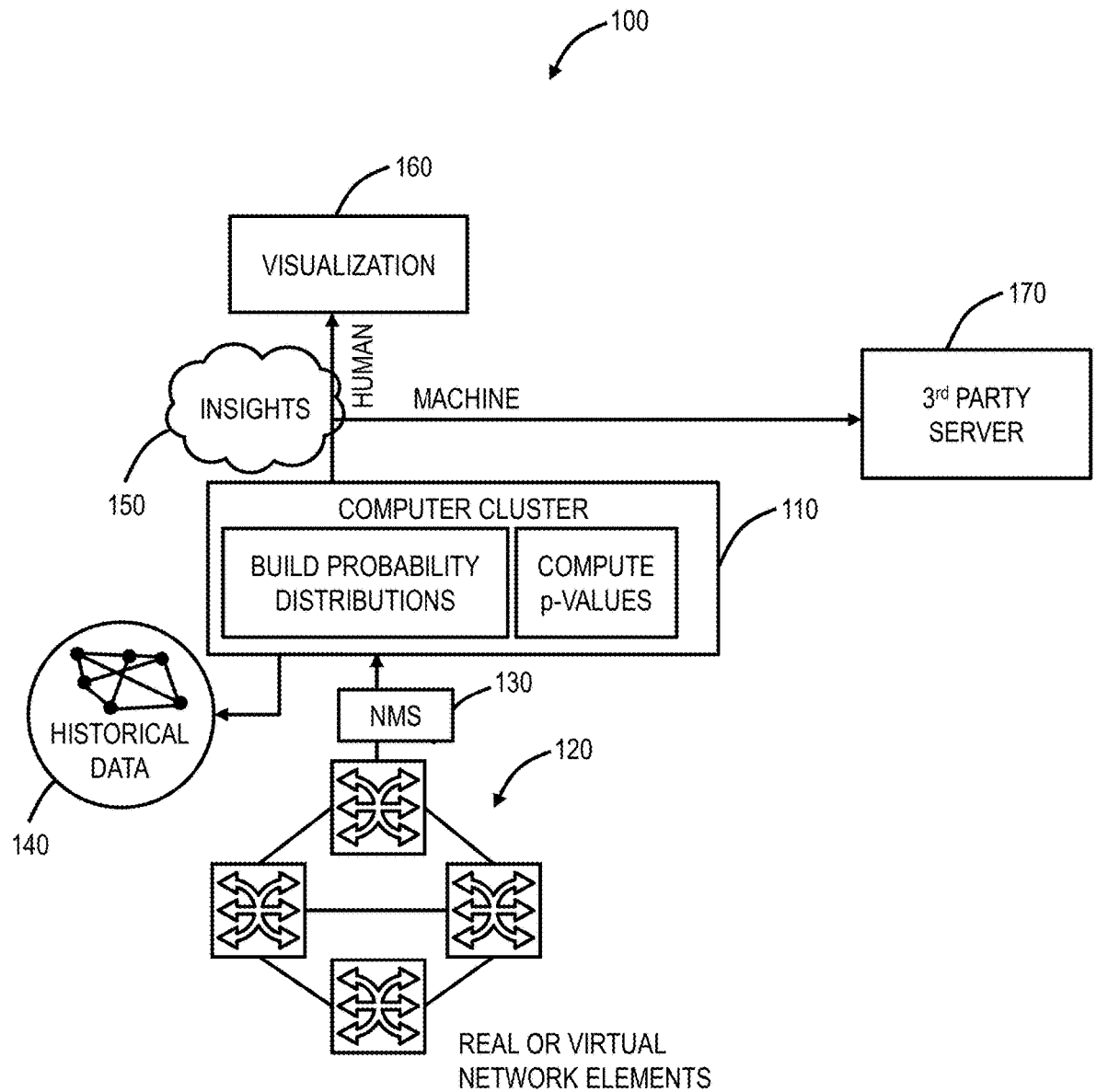
FIG. 1 is a block diagram of an anomaly detection system.

Again, in various embodiments, the present disclosure relates to systems and methods to detect abnormal behavior in networks using supervised machine learning and using probability distributions derived from unlabeled multivariate data. The systems and methods can be implemented through a software application executed on a processing device communicatively coupled to a network. The systems and methods utilize big data and machine learning on datasets from the network with associated algorithms to develop actionable insights based thereon. The software application can be in a Networks Operations Center (NOC) or the like and can continuously operate to provide the actionable insights. In this manner, the software application can provide valuable analytics to assess current and potential future network health. The software application uses training data associated with normal network operations and once trained, the software application can operate on ongoing network data to derive either probability of anomalies (such as on a per Network Element (NE) basis) or likely problems based on classification. Specifically, the software application can operate either with supervised learning, unsupervised learning, or both.

Advantageously, the machine learning described herein enables the software application to learn the thresholds on various performance monitoring metrics and what is normal/ abnormal, removing the requirement for expert involvement. The software application described herein can operate with supervised and/or unsupervised learning techniques. In an application, the software application can be referred to as a Network Health Predictor (NHP) which can cooperatively operate with existing network management platforms to complement the existing alarm/alert systems. The NHP can proactively provide actionable insights into network activity including proactive alerts for maintenance in advance of failures or faults, smart alarming which reduces the need for subject matter experts in network management by correlating multiple alarms for root cause analysis, and the like.

The software application of the systems and methods uses relevant Performance Monitoring (PM) data to describe the behavior of a telecommunications network. The network can include an optical layer (e.g., Dense Wavelength Division Multiplexing (DWDM), etc.), a Time Division Multiplexing (TDM) layer (e.g., Optical Transport Network (OTN), Synchronous Optical Network (SONET), Flexible Ethernet (FlexE), etc.), a packet layer (e.g., Ethernet, Multiprotocol Label Switching (MPLS), Internet Protocol (IP), etc.), and the like. Those skilled in the art will recognize that actual network implementations can span multiple layers. The software application can operate at a single layer or concurrently at multiple layers. Each of these layers can include associated PM data which describes the operational status over time at the layer.

Examples of PM data include, without limitation, optical layer data, packet layer data, service and traffic layer data, alarms, hardware operating metrics, etc. The optical layer data can include pre-Forward Error Correction (FEC) Bit Error Rate (BER), post-FEC BER (estimate), number of corrected errors, chromatic dispersion, Polarization Dependent Loss (PDL), Estimated Optical Signal to Noise Ratio (OSNR), latency, TX power, RX power (total, individual channels), power loss, Q factor, fiber type and length, etc. The packet layer data can include port level information such as bandwidth, throughput, latency, jitter, error rate, RX bytes/packets, TX bytes/packets, dropped packet bytes, etc. The service and traffic layer data can be Time Division Multiplexing (TDM) Layer 1 (L1) PM data such as Optical Transport Network (OTN). The packet layer data can be associated with a device port while the service and traffic layer data can be associated with a particular L1 connection/ service. The alarm data can be various types of alarms supported by a network element (e.g., chassis, MPLS, SECURITY, USER, SYSTEM, PORT, SNMP, BGP-MINOR/WARNING/MAJOR/CRITICAL, etc.). The hardware operating metrics can include temperature, memory usage, in-service time, etc.

Throughout, the term network elements (NE) can interchangeably refer to a variety of network devices, such as nodes, shelves, cards, ports, or even groups of such NEs. No matter the identity of the elements, however, the technique described herein for determining the normalcy of their behavior remains identical and remains valid as long as the relevant PM data for each element are accessible to the anomaly detection software application.

Supervised Machine Learning

Variously, the software application can automatically detect abnormal behaviors in packet or optical networks by analyzing performance monitoring metrics with Machine Learning (ML) techniques. The software application can use supervised machine learning algorithms such as Decision Trees, Random Forest, Support Vector Machine or Artificial Neural Networks to detect anomalies in networks. The software application includes a classifier which supports custom tuning based on an Application Programming Interface (API) which exposes machine learning parameters, adjustments of Receiver Operating Curves (ROC) describing a relationship of sensitivity versus precision, adjustments of User-defined thresholds (or ranges) on ML regression outputs, adjustments of operating points to satisfy user-defined cost-benefit analysis. The software application uses multiple classifiers to identify different types of anomalies for root cause analysis. The software application can combine multiple features (100 s or more) into a single maximally-accurate classifier.

For the supervised machine learning, the software application can use a dataset labeling methodology to encode telecom domain expertise, use realistic simulators as a complement to real networks to produce labeled datasets, use testing datasets to characterize the performance of trained classifiers, etc. The software application can be deployed for a variety of different telecommunications networks and devices, using four different modes of operations:

a) on-demand: trained classifier executed on a computer, once, for a given network data snapshot;

b) batch: PM data is imported to a computer cluster in a batch (e.g., once per day or week) and trained classifier is executed multiple times to analyze the new incoming data;

c) streaming: PM data is continuously ingested by a computer cluster and a trained classifier is analyzing a data stream in near real-time; and d) embedded: trained classifier is embedded in a telecommunications device, data analysis is executed in actual real-time directly on the device.

Advantageously, the software application removes the need for manual intervention completely; the anomaly detection software is run automatically. The software application simplifies the work of telecom experts considerably: there is only a need to classify network events by types (normal condition, the anomaly of given type, the anomaly of a different type, etc.) and group them together in labeled datasets. But there is no need for a detailed understanding of why and how the problem occurs. Machine learning empirically learns how to identify each type of event from the symptoms (a.k.a. "pattern") showing in the performance monitoring data. Choice of input performance monitoring metrics can even be automated with feature ranking algorithms (such as information gain). Machine learning performs a multi-dimensional analysis that is typically much more accurate than any one-dimensional analysis. Thresholds are automatically determined by the ML algorithm. Choice of input performance monitoring metrics can be automated with feature ranking.

FIG. 1 is a block diagram of an anomaly detection system 100. The anomaly detection system 100 includes a computer cluster 110 executing the software application ("anomaly detection software"). Performance monitoring (PM) data can be collected from a network 120. The network 120 can include various physical or virtual network elements and can operate at any of the layers and/or protocols described herein. The data collection can optionally happen via a Network Management System (NMS) 130, a Software Defined Networking (SDN) controller, etc. The anomaly detection software consumes the PM data. The anomaly detection software is executed on the computer cluster 110, possibly hosted in the cloud, and such as with horizontally scalable processors and storage. The storage is used to record the history of all PM data, i.e., historical data 140.

The anomaly detection software trains the ML from the historical data 140 to detect anomalies from live incoming data from the network 120. When the anomaly detection software detects abnormal behavior, an insight 150 can be either communicated to a human operator (visualization 160) or to a third-party server 170 with machine-to-machine API. The insight 150 can be an action in the network 120 or an updated configuration of the network 120.

The anomaly detection software detects abnormal behaviors in the network 120 by analyzing performance metrics from live networks 120 with supervised machine learning algorithms. For example, the anomaly detection software can train supervised ML algorithms with labeled datasets. The ML algorithms can include Decision Trees, Artificial Neural Networks, etc. and these techniques can combine multiple inputs (for example hundreds) into a single maximally-accurate classifier. The anomaly detection software uses regression techniques to produce actual ML outputs, ROC curves are built from the regression output, and customized tuning can occur between sensitivity versus precision of the final (binary) classifier.

The anomaly detection software can optionally train multiple classifiers specialized for different types of anomalies with each classifier trained from a specialized dataset. For example, a yes/no decision from each classifier provides information about the root cause of detected anomalies. For certainty, this is only one strategy among several others to achieve multi-class predictions using binary classifiers.

The anomaly detection software isolates telecom expertise to the preparation of input datasets. That is, expertise is only required on the classification of the inputs. This includes selecting relevant Performance Monitoring data; collecting data from production or test-bed networks; dividing network data in snapshots, and assigning labels to each snapshot according to the observed behavior; using realistic simulators to complement data from real networks; and using testing datasets to characterize and validate the performance of trained classifiers.

Automated Detection of Abnormal Behaviors Using Supervised Machine Learning

To predict the abnormal behavior of an optical link, the anomaly detection software relies on classifiers built using supervised machine-learning algorithms, applied to the metrics collected from the network 120. The goal is to predict the behavior of telecommunications devices by applying a trained classifier on the performance metrics continuously collected from the network 120. One of the benefits of leveraging supervised learning is that, while constructing and training a classifier is usually computationally expensive, applying the trained classifier to live PMs is usually a lightweight process, thereby allowing for applications where anomalies are automatically detected in real-time by the system 100. In addition, supervised learning techniques can produce sensitive and accurate classifiers in a largely automated way, and can be re-used to a wide variety of problems with only minimal modifications. Hence, the system 100 can be equally applied to detect abnormal behavior of an optical link, a packet or an optical switch, a router, a carrier Ethernet edge device (CESD), a traffic pattern over a service, and many other components.

The system 100 is flexible and applicable to any supervised learning algorithms. Key performance indicators for several algorithms covering various types of algorithms are described herein: Ensemble (Random Forest), Deep Learning (multilayer neural net), Decision tree (J48) and Boosting (LogitBoost).

Table 1 illustrates examples of some of the performance monitoring data at the optical layer that can be used to assess the behavior of the links. Again, these metrics are continuously collected from increasingly large networks, thereby producing large amounts of data to analyze. For example, a network with 500,000 elements collecting the five metrics mentioned in Table 1 every 5 minutes generates over 8,000 metrics per second. As a result, manual analysis and anomaly detection is not a practical (and scalable) solution, but automated ML-based detection can solve such a problem at scale.

TABLE 1

Performance Metrics Description

| Performance Monitoring Type | Description |
| --- | --- |
| Tx | Transmit power which is the initial input into the optical network |
| Rx | Received power at a termination point of an optical network |
| OSNR | Optical Signal to Noise Ratio |
| Q-Factor | Also known as quality factor, indicates the receiver performance as function of OSNR |
| BER | Bit Error Rate which can be calculated from the Q-factor |

Figure 2:
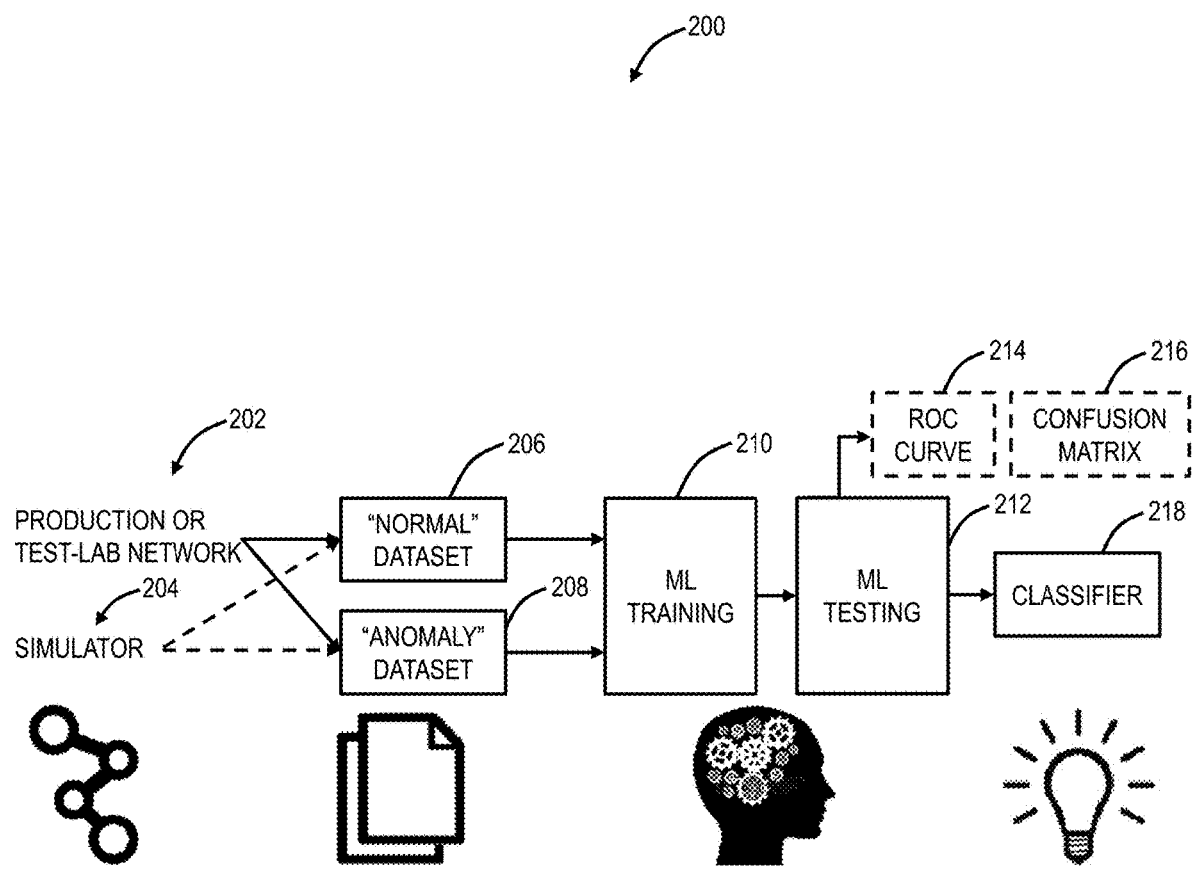
FIG. 2 is a flow diagram of supervised learning in the anomaly detection software.

FIG. 2 is a flow diagram of supervised learning 200 in the anomaly detection software. The supervised learning 200 includes live network data inputs 202 or simulated network data inputs 204 which are PM data. The various inputs 202, 204 are classified as normal datasets 206 or anomaly datasets 208 which are provided to ML training 210. The ML training 210 connects to ML testing 212 which outputs ROC curves 214, a confusion matrix 216, and a classifier 218. The supervised learning 200 includes Training ML algorithms with labeled datasets 206, 208, use of regression techniques to produce actual ML outputs, and to train multiple classifiers specialized for different types of anomalies.

The goal of training ML algorithms is to construct a classification function—also known as the classifier 218—that can recognize normal/abnormal behaviors by formally encoding human expert knowledge. Human-expert knowledge is communicated from the inputs 202, 204 in which relevant PM data is labeled as "normal" or "abnormal" by a human expert (described in additional detail herein). It is expected that anomalies in a real network are rare events. In order to be effective, the distribution of the anomalies in training set should thus be representative of the live PMs that are collected from the network 120 and used to detect the anomalies. This distribution yields an unbalanced dataset, for example where 95% of the instances describe a normal behavior, and 5% describe anomalies.

The ML algorithms can include Decision Trees, Artificial Neural Networks, and many others. This labeled datasets 206, 208 are leveraged by a supervised machine-learning algorithm to build the classifier 218 and train it to recognize the normal/abnormal behavior. The actual training depends on the machine-learning algorithm. It is usually computationally expensive and is usually performed offline. The anomaly detection software is flexible enough to accommodate any supervised machine-learning algorithm, including Random Forest, Deep Neural Networks, Support Vector Machines, etc.

The anomaly detection software can combine multiple inputs 202, 204 (for example hundreds) into a single maximally-accurate classifier 218. Manual approaches or hard-coded if . . . else . . . statements in a rule-based engine are practical only for a very limited number of input metrics. In addition, typical hard-coded if . . . else . . . statements do not generalize well, have a tendency to over-fit, and are difficult to maintain as they cannot be easily 're-trained' as new data is made available. Using machine-learning techniques as described herein, it becomes possible to overcome those limitations and dynamically combine numerous performance metrics (up to hundreds or thousands given sufficient computational resources) to build a globally optimized and maximally accurate classifier 218.

Figure 3:
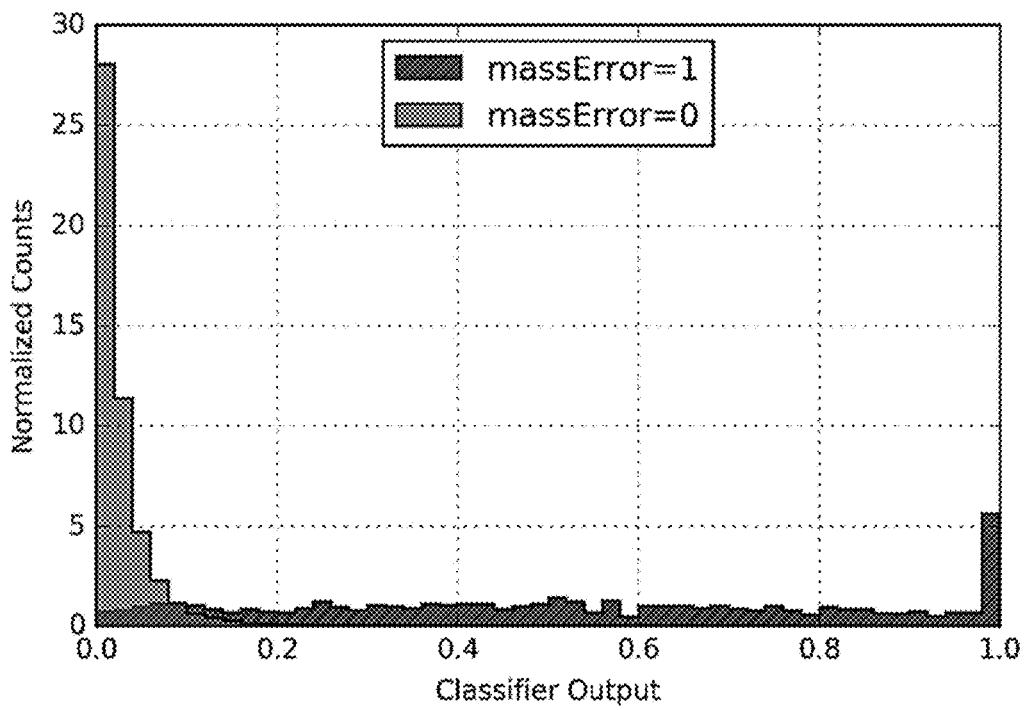
FIG. 3 is a graph of a regression output from a Random Forest algorithm on a sample dataset for massError==0 (normal behavior) and massError=1 (abnormal behavior) in a test sample.

While optimized, classifiers 218 cannot perfectly detect anomalies in a network for a variety of reasons, i.e., it is usually not possible to achieve 100% precision and 100% sensitivity: there is a tradeoff between precision and sensitivity, resulting in false negatives and false positives. Network operators have different requirements in terms of precision/sensitivity. To accommodate those various needs, regression techniques are employed to produce the actual output of the machine-learning algorithm, that is, the algorithm outputs a floating number between 0 (normal behavior) and 1 (abnormal behavior). FIG. 3 is a graph of a regression output from the Random Forest algorithm on a sample dataset for massError=0 (normal behavior) and massError=1 (abnormal behavior) in a test sample.

Figure 4:
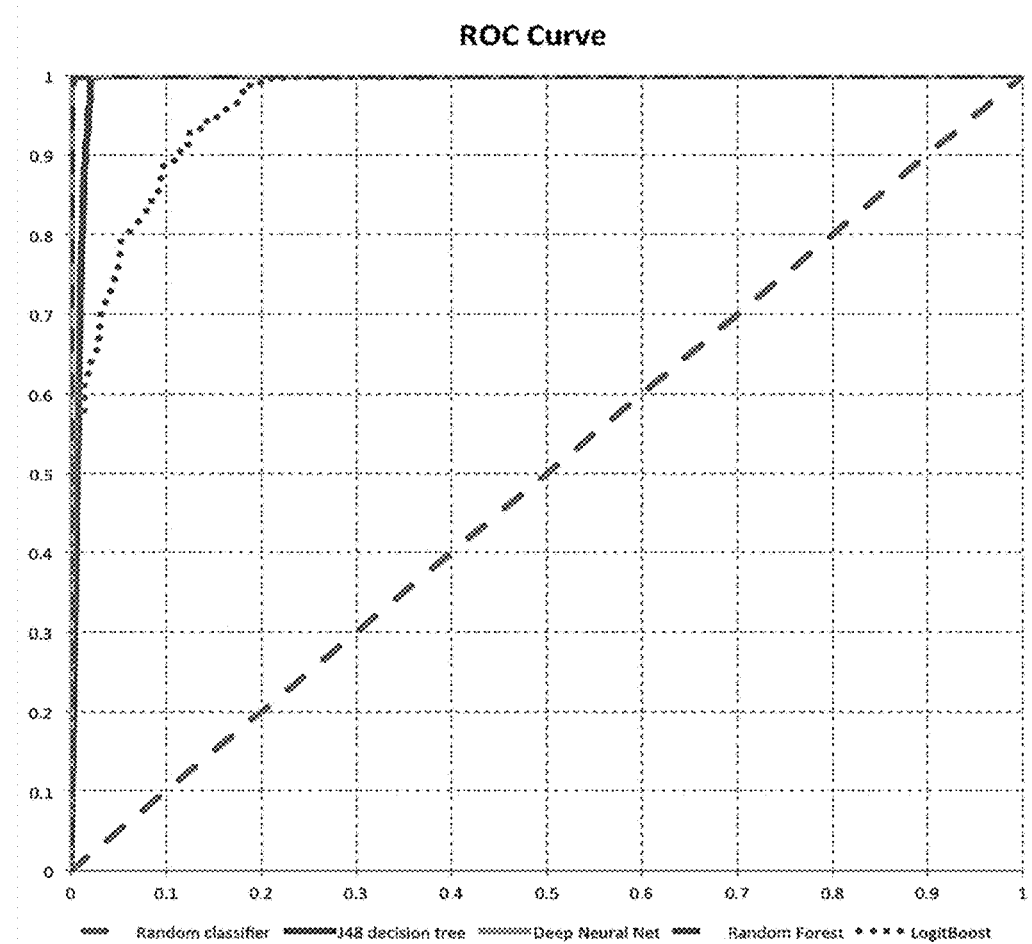
FIG. 4 is a graph of Receiver Operating Curves (ROC) curves of several Machine Learning (ML) algorithms on a sample dataset.

The final binary classifier is obtained by thresholding the regression output. The choice of the threshold greatly impacts the final precision and sensitivity of the algorithm. Standard Receiver Operating Characteristic (ROC) curves (FIG. 4 is a graph of ROC curves of several ML algorithms on a sample dataset) represent the sensitivity as a function of the false positive rate (i.e., 1-precision) and can be used to visualize the performance of the classifier 218 when the threshold varies between 0 and 1. A major benefit of analyzing the regression output of the algorithm using its ROC curve is that it empowers operators to tune the discriminating threshold to apply to the regression output depending on their precision/sensitivity requirements, thereby optimizing the costs to operate the network 120. This is a major feature of the systems and methods.

The classifier 218 can optionally be trained to recognize the type of anomaly, which can be useful for root cause analysis. This is achieved by training multiple intermediate classifiers 218 as described above, each specialized to recognize one type of anomaly. The final classifier is obtained by combining the output of the intermediate classifiers 218. Alternatively, it is also possible to train a multi-class classifier 218. The anomaly detection software can leverage both approaches to detect multiple types of anomalies. At the end of this process, the trained ML model(s) are persisted to a storage unit so they can be used by external programs out-of-the-box, without needing to re-train.

Telecom Expertise for the Preparation of Input Datasets

The use of telecom expertise is important in determining the relevant performance monitoring parameters to be used in a training set. Ideally, each parameter in the data provides some information on whether or not an anomaly has occurred. By jointly combining these relevant parameters, a human could make a precise decision on the outcome, labeling it as normal or abnormal. A methodology is described herein for obtaining relevant performance monitoring data for optical networks, for example, which can be extended to any type of network 120.

In optical transmission, certain parameters play an imperative role in ensuring fault-tolerant transmissions over long transmission lengths. The most important parameter used to ensure the quality of design is the Bit Error Rate (BER). For example, a target BER of $10^{-12}$ requires that on average, only one out of every $10^{12}$ bits will be in error. However, for such small error rates, it would be required to sample data from the network 120 for a long time in order to obtain statistically meaningful measurements of BER. Since measuring BER directly is very time expensive, the Optical Signal to Noise Ratio (OSNR) is instead measured, which in turn provides a measure of the Q-Factor, ultimately providing the coveted BER. The relationships between OSNR, Q-Factor, and BER are well known and satisfy certain mathematical relationships. These relationships will also assist in generating realistic simulated data. After careful analysis, a subset of parameters is chosen which ultimately provide the highest correlation with the condition of the network 120. Again, these are illustrated in Table 1.

Data from Production or Test-Bed Networks

Figure 5:
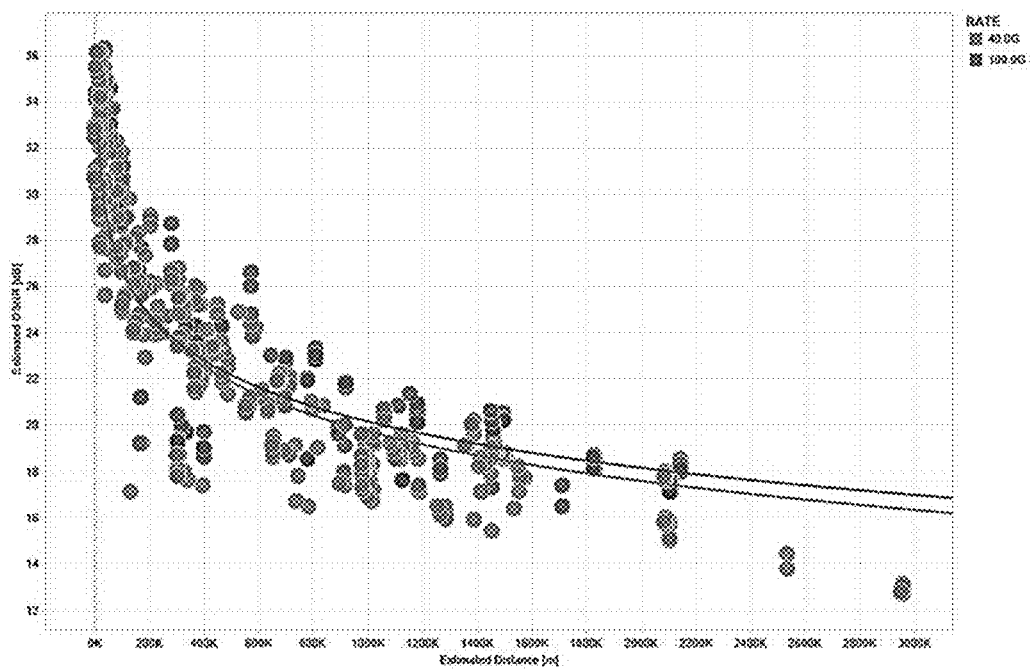
FIG. 5 is a graph of Optical Signal to Noise Ratio (OSNR) versus distance obtained from real optical networks.

In order to better understand the behavior of the optical network 120 under normal conditions, performance monitoring metrics can be sampled from live or test optical networks in a controlled environment using relevant metrics above. Collecting metrics from a well-defined network ensures the integrity of the metrics and provides a baseline for normal/expected behavior. Once there is sufficient data for a baseline, controlled errors can be introduced into the network 120 to measure the change in metrics induced by these errors. This data collection is carried out over varying optical link lengths, which can then be used to build a generalized model over many distances. FIG. 5 is a graph of OSNR versus distance obtained from real optical networks, at a bandwidth rate of 40 Gbps and 100 Gbps.

Divide Network Data into Snapshots and Assign Labels to Each Snapshot According to Observed Behavior After data collection is complete, the use of telecom expertise is leveraged to partition the data into snapshots, followed by precise labeling of each snapshot. Labeling can be binary, i.e., normal versus anomaly, but also can be generalized to multiclass labels where there may be many different types of anomalies. The granularity of labels does not have a limit in theory, although there is a relationship between performance/complexity and the amount of information one wishes to detect from the network 120.

Realistic Simulators to Complement Data from Real Networks

The preparation of labeled datasets to train ML algorithms can be achieved solely from real production or test-bed networks. However, it is often advantageous to complement real network data with simulated ones. Advantages of simulated data include the possibility to generate an arbitrarily large amount of statistics for each type of labels (especially useful to build datasets from rare anomalies), possibility to build datasets quickly and flexibly, and knowledge of the true root cause for any feature in the datasets. The preparation of simulators requires telecom domain expertise. However, afterward, the usage of datasets originating from real or simulated networks is identical from an ML point of view.

In this sub-section, an example of how to simulate labeled datasets is described. After sufficient real network performance monitoring data has been collected with sufficient labeling, there is sufficient information to describe the relationship between each data type versus distance. This model serves as a baseline in order to simulate a large amount of data describing the behavior of an optical link. Large datasets are required since insufficient data can lead to poor generalization and overfitting. The behavior of the simulated data is inferred not only form the previously collected data but also with mathematical models provided by experts. The following methodology can be used to develop a highly realistic simulator for optical networks corresponding to metrics in Table 1.

Q-factor calculations from OSNR are provided by experts. Assume a raw bit rate of 140 Gbps corresponding to 100 Gbps line rate, considering FEC. This particular configuration corresponds to an optical modem. Relationships for other parameters can be derived, for example, as with BER. This type of analysis can be performed for all other models of cards and rates as desired. Cards are physical hardware devices in the network elements in the network 120.

$B_e$: (electrical bandwidth of the receiver filter)=35e9
$B_o$: optical bandwidth of the end device (photodetector) =12.5e9

$$NR_{noise} = \frac{B_e}{B_o 10^{\frac{OSNR}{10}}}$$

First, simulate the behavior of normal optical links over varying distances with the following parameters:
1. Span length of 80 km. This implies the introduction of an optical amplifier at the end of each span.
2. Number of spans/stages: N
3. Span loss: 0.2 dB/km (expected fiber attenuation) expressed as $\zeta$
4. Input power (Tx) is sampled from a Gaussian with mean −0.5 dB and variance 0.75 dB
5. The received power (Rx) expressed a function of span loss (0.2 dB/km) and distance, as well as the noise figure (NF) introduced at each amplifier Given a span loss of 0.2 dB/km, the OSNR can be described as a function of the number of stages (amplifiers), the noise introduced at each stage (NF), and the initial input transmit power (PIN). In the case of link degradation, introduce a larger attenuation; instead of the normal 0.2 dB/km, this is now an average loss of 0.27 dB/km. The added attenuation is also characterized as a normal random variable in order to introduce variability in the model.

Figure 6:
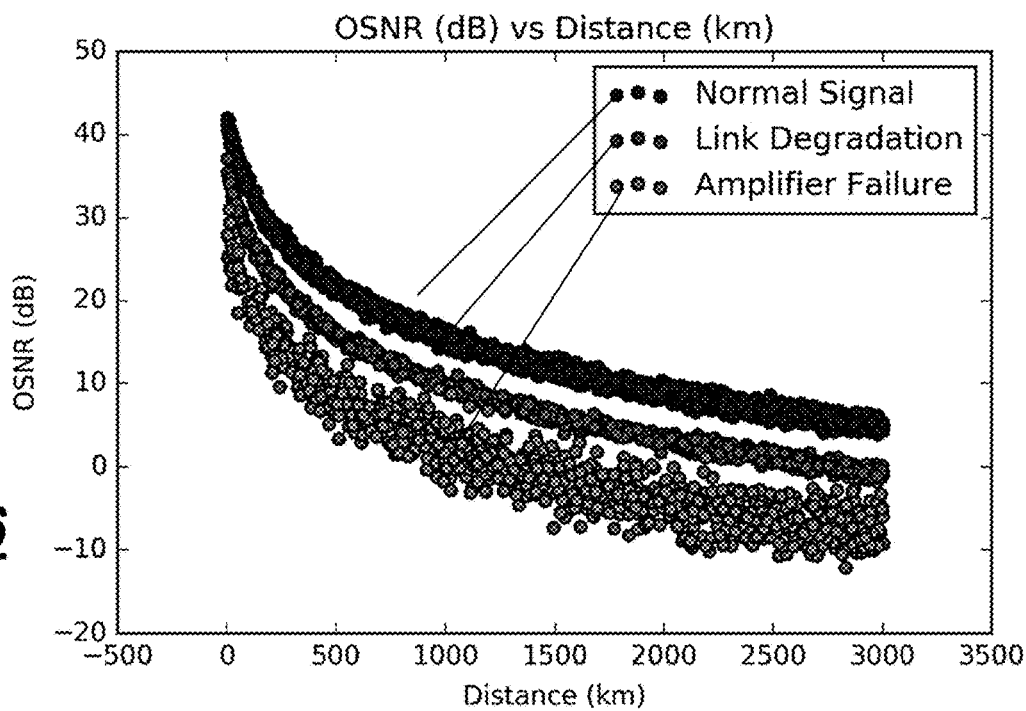
FIG. 6 is a graph of OSNR versus distance from simulated optical link data.

For the case of amplifier failure, assume the instance where only one amplifier fails (in a long link, there are many amplifiers in series). The reduction in OSNR is a sample from a Gaussian with a mean of 13 dB and variance of 1. FIG. 6 is a graph of OSNR versus distance from simulated optical link data. FIG. 6 provides an example of simulated data, which provides values of OSNR over varying distances in the cases of normal behavior, as well as with link degradation and amp failure. This dataset subsequently serves as a supplementary input into machine learning algorithms in order to build an anomaly detection classifier 218.

Using Testing Datasets to Validate the Performance of Trained Classifiers

After the ML training using labeled datasets, the development of the classifier techniques is completed. Before deploying in production, it is possible to measure the performance of the classifier 218 in diverse conditions with independent testing datasets. Through this procedure, the classifier 218 performance can be characterized by a number of standard metrics described below.

The accuracy of the classifiers 218, thereby their ability to correctly predict anomalies in the network 120 is evaluated using 10× cross-validation. This validation approach is widely used in machine-learning and includes:

1. Training a classifier using 90% of the labeled dataset randomly selected,
2. Evaluating classifier using the remaining 10%, and
3. Repeating 10 times and report consolidated results.

As anomalies are rare events and the dataset is unbalanced, reporting the overall accuracy of the classifiers is not sufficient. The following Key Performance Indicators (KPIs) are provided:

Overall accuracy;

Precision (probability that a predicted anomaly is a real anomaly);

Recall (probability that an anomaly is detected when it occurs); and

F1-score (harmonic mean of precision and recall),

Where:

|  |  | Machine-learning Prediction | |
|---|---|---|---|
|  |  | Anomaly | Normal behavior |
| Human expert | Anomaly | TP (true positive) | FN (false negative) |
|  | Normal behavior | FP (false positive) | TN (true negative) |

Figure 7:
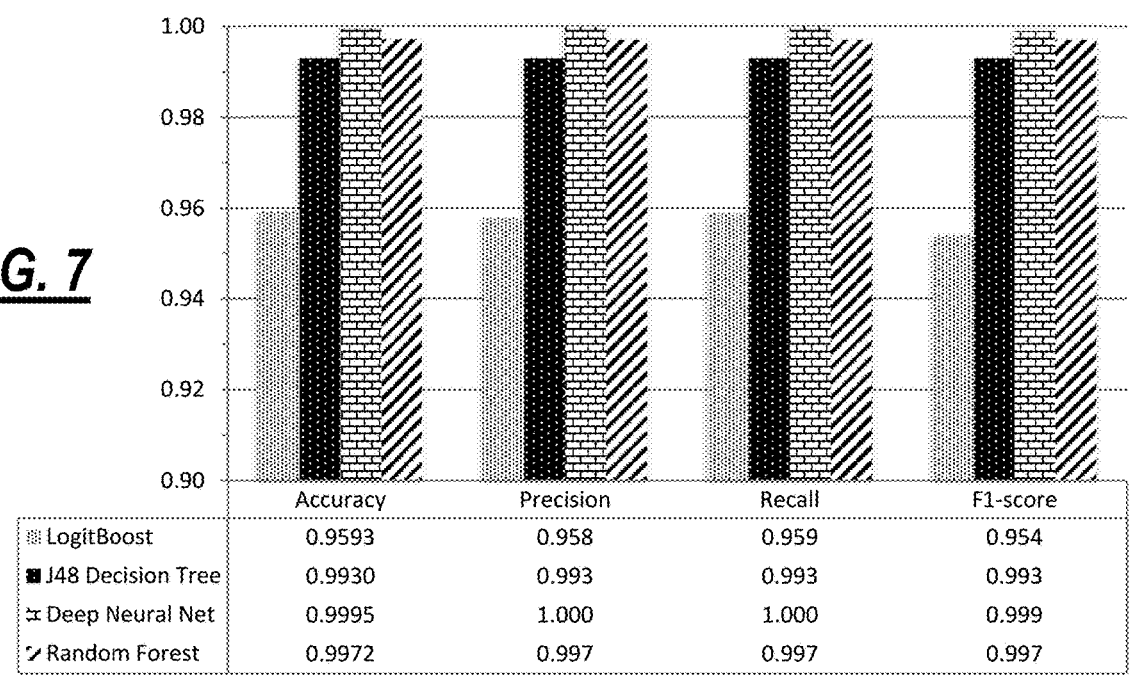
FIG. 7 is a graph of Key Performance Indicators (KPIs) and confusion matrices obtained on simulated optical network data for four different supervised ML algorithms.

For example, the KPI and confusion matrices 216 obtained on simulated optical network data are reported in FIG. 7 for four different supervised ML algorithms. FIG. 7 is a graph of KPIs obtained on simulated optical network data for four different supervised ML algorithms. On this sample dataset, the deep neural network is more accurate than the other approaches. Results may vary depending on the input datasets. The following illustrates confusion matrices for the four different supervised ML algorithms.

TABLE 2a confusion matrix for LogitBoost

|  | Predicted as | | |
|---|---|---|---|
|  | Normal behavior | Link degradation | Amplifier failure |
| Normal behavior | 10,772 | 6 | 1 |
| Link degradation | 331 | 289 | 4 |
| Amplifier failure | 114 | 32 | 451 |

TABLE 2b confusion matrix for J48

|  | Predicted as | | |
|---|---|---|---|
|  | Normal behavior | Link degradation | Amplifier failure |
| Normal behavior | 10,778 | 1 | 0 |
| Link degradation | 15 | 603 | 6 |
| Amplifier failure | 0 | 12 | 585 |

TABLE 2c confusion matrix for Deep Neural Net

|  | Predicted as | | |
|---|---|---|---|
|  | Normal behavior | Link degradation | Amplifier failure |
| Normal behavior | 10,779 | 0 | 0 |
| Link degradation | 2 | 622 | 0 |
| Amplifier failure | 0 | 4 | 593 |

TABLE 2d confusion matrix for Random Forest

|  | Predicted as | | |
|---|---|---|---|
|  | Normal behavior | Link degradation | Amplifier failure |
| Normal behavior | 10,778 | 1 | 0 |
| Link degradation | 15 | 603 | 6 |
| Amplifier failure | 0 | 12 | 585 |

Deployment

Once the supervised ML models are trained, calibrated and tested with PM data samples originating from telecommunications networks, the trained ML classifier(s) 218 are persisted to a storage unit so external programs can use them. The persisted classifier(s) 218 can be effectively deployed to detect abnormal behaviors in live telecommunications networks. As shown in FIG. 1, the anomaly detection software is executed on a computer cluster capable of collecting PM data from a live telecommunications network. The machine-learning training typically requires significant data storage and data processing capabilities. However, the simple execution of one (or several) trained classifier(s) 218 is a relatively lightweight process.

As a result, the anomaly detection software can be deployed in different modes:

On-demand: trained classifier 218 executed on a computer, once, for a given network data snapshot;

Batch: PM data imported to a computer cluster in batch (e.g., once per day or week) and trained classifier 218 is executed multiple times to analyze the new incoming data;

Streaming: PM data continuously ingested by a computer cluster and trained classifier 218 is analyzing the data stream in near real-time; and Embedded: trained classifier 218 is embedded in a telecommunications device, data analysis is executed in actual real-time directly on the device.

The Embedded mode of operation exploits an interesting feature of machine-learning, namely that it requires Big Data and massive computation power for its training, but only minimal CPU and data for its execution. Furthermore, once the trained classifier 218 is persisted to a storage unit, it becomes easy to decouple its training from its execution. Hence it is conceivable that ML training could happen on a multi-CPU's computer cluster, but classifier execution happens on a small single CPU device (such as a telecommunications device, for instance).

In either of the above modes, the anomaly detection software can be used to detect a wide range of problems, as long as the ML is trained with insightful datasets and Classifier execution is fed with data that is similar to the training datasets. Hence, this anomaly detection software provides a new powerful and versatile way to build and deploy automated anomaly detection software for a variety of telecommunications networks and devices.

Unlabeled Training Data

Again, the anomaly detection software aims to detect abnormal behaviors in telecommunications network elements with a software application connected to a network data acquisition system. The data acquisition system has access to multiple Performance Monitoring (PM) metrics that characterize the network's behavior in a comprehensive way. The anomaly detection software performs statistical comparisons of given network snapshots with respect to one or several reference data sample(s). In another embodiment, the anomaly detection software can operate with unlabeled training data. The previous approach required a human expert to classify the inputs 202, 204 into normal and anomaly datasets 206, 208. This unlabeled approach omits this step. The approach is remarkable for two main reasons: 1) it works with "unlabeled" reference data samples that only require minimal preparation and 2) it exploits information from multiple metrics and reduces it to a single statistically sound probability (a.k.a. p-value). Here, the anomaly detection software can be seen as a specialized anomaly detection application for telecommunications networks based on unsupervised Machine Learning (ML).

The anomaly detection software uses machine learning with unlabeled training data with the capacity to have multiple inputs, with a single numerical value as output (probability of an anomaly). As described herein, a label indicates whether data is normal or abnormal (or possibly, even more, categories). Unlabeled data has no such indication. The anomaly detection software includes the automatic selection of the most relevant set of Performance Monitoring metrics among a multitude of possibilities. For example, Pearson correlations across PM data can be used to determine this set.

The anomaly detection software includes the usage of a well-defined hypothesis testing procedure to ascertain the normalcy of a network element from a statistical point of view. Kernel Density Estimates (KDE) are used to build sound probability density functions of the typical operating ranges of each PM metric. This works without a priori assumptions about the expected distribution shape and in low sample size regimes.

The anomaly detection software includes a combination of statistical independent p-values into a single one per network component, such as using Fisher's method or the like. The anomaly detection software decouples processor intensive training (offline) versus lightweight execution (real-time). Similar to the supervised machine learning approach, the unsupervised approach can operate on-demand, batch, streaming, or embedded.

The anomaly detection software in this unsupervised mode simplifies the work of telecom experts considerably, removing the classifying steps. The experts only need to ensure that the network data is being collected consistently. Global likelihood conveys a multi-dimensional analysis that is typically much more accurate than any one-dimensional thresholding. Ad hoc thresholds on absolute PM values are replaced by universal thresholds on p-values. Choice of input performance monitoring metrics can be automated with the use of Pearson correlations.

Similar to the supervised machine learning approach, the unsupervised machine learning approach operates in the system 100 in FIG. 1. The PM data of the network elements are initially collected off of a live telecommunications network, either by connecting directly to each network element or via a Network Management System (NMS). This PM data is then processed by a software application that is executed on a computer cluster, possibly hosted in the cloud, with the horizontally scalable processor and storage capacities. PM data is stored on the cluster and organized in data sets. CPUs are used to process datasets for building probability distributions turned into global likelihood functions, in what could be described as unsupervised ML training. The probability distributions are derived from Kernel Density Estimate (KDE) models. The likelihood functions are then used to compute p-values and detect anomalies from new incoming network data. When the software application detects abnormal behavior, the insight can either be communicated to a human operator, or sent to the third-party server with machine-to-machine APIs.

Figure 8:
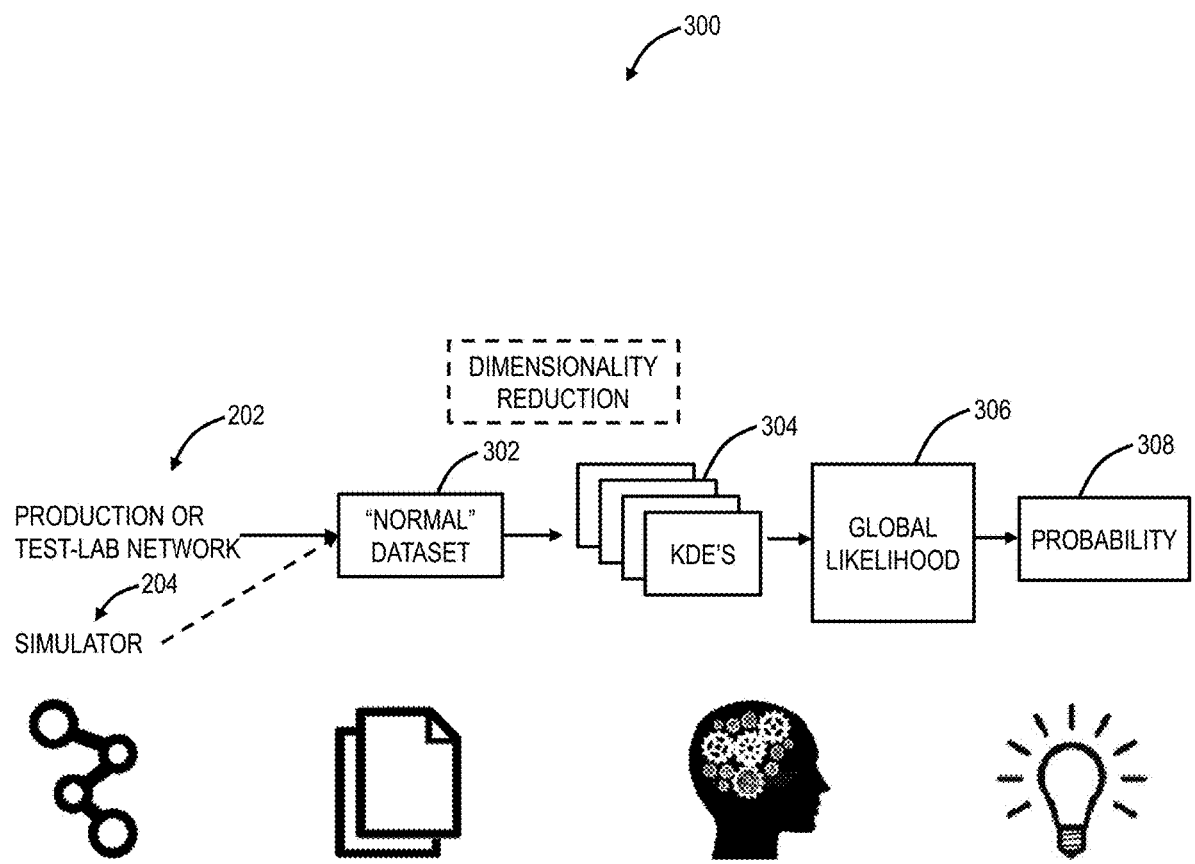
FIG. 8 is a flow diagram of the unsupervised learning methodology.

FIG. 8 is a flow diagram of an unsupervised learning 300 methodology. The unsupervised learning 300 includes live network data inputs 202 or simulated network data inputs 204 which are PM data, similar to the supervised learning 200. However, all of the inputs 202, 204 are provided in a single, unlabeled dataset 302 which is used to derive KDE models 304 which provide a global likelihood 306 which provides p-values 308, i.e., the probability of an anomaly. As described below, the complete flow is PM KDE Likelihood p-value.

Preparation of the Training Dataset

First and foremost, this unsupervised ML approach can be applied to unlabeled data. In other words, it can be applied to a variety of data for which we do not know, even a posteriori, whether a particular network element was behaving normally or not. This is a novelty, and a major advantage over standard supervised learning techniques because labeled PM data is notoriously hard to retrieve from telecommunications networks in an automated and reliable way today. Second, one must require that the training dataset is representative of a normally functioning network. From there, this approach can automatically flag any departure from expectation in a robust statistical fashion.

Hypothesis Testing

The objective measure to be used is a null hypothesis probability called the p-value. In this context, the hypothesis is that the network element (or another network component, device, etc.) is functioning normally and the p-value is the probability of observing more extreme PM values than what is observed, assuming a normally functioning network. Hence, low p-values are indicative of abnormal behavior (i.e., the null hypothesis is improbable). Again, the behavior of a typical network element is described by a variety of PM data. A key feature of this approach is its ability to combine information from multiple PMs to produce a unique p-value per network element (or another network component, device, etc.) at any given time, thus reducing the behavioral state of a network element to a single unambiguous number between 0 and 1.

Kernel Density Estimates

For comparable network elements (identical in type and in usage), their PM data can be aggregated into a unique probability density function (PDF). The PDF of each PM is inferred using the KDE approach. The KDE is a non-parametric method that is well suited because it works without a priori assumption about the expected distribution shape of the PMs data and it works in either low or high sample size regimes. For n different PMs, it is technically possible to produce an n-dimensional KDE. However, by default, the application can model each PM independently, with a 1-dimensional KDE. This is because building multi-dimensional KDEs requires datasets of very large sample sizes to be reliable and accurate. The produced 1- or n-dimensional PDFs are then used as models of the PM data in the next steps.

Automated Feature Selection

For a typical NE, at least a dozen PM metrics can be relevant to describe its behavior fully. In this case, it is not advised to work with a full n-dimensional KDE. To address this, the software application attempts to select the most relevant set of metrics automatically, and hence reduce the problem to a manageable dimensionality while keeping most of the information. This is one of the novel features, namely dimensionality reduction.

To achieve this, the software application exploits a statistical property stipulating that a group of uncorrelated metrics can be modeled by the product of its individual 1-dimensional models. Hence, the software application computes the Pearson correlation matrix of each n×n PM combination and identifies the maximal set of uncorrelated metrics that are to be treated as the product of their respective 1-dimensional models. The other correlated metrics are filtered out by default.

If an expert user identifies one or several set(s) of partly correlated metrics that provide especially important information, he or she can override this default and specify the PMs that shall be modeled as n-dimensional KDE via the software's API. However, in practice, it is not recommended to go beyond n=2 or n=3.

Likelihood Functions

After a set of PDFs have been built from reference PM data, the software application proceeds to build a likelihood function for each PDF. This is achieved by a sampling method. Under the assumption that all PDFs were derived from PMs (or group of PMs) that are mutually uncorrelated, the software application finally builds a global likelihood 306 function equal to the product of the individual likelihoods. In practice, the application uses the sum of likelihood logarithms instead of a direct product of likelihoods in order to increase its stability against very small numbers. But these two operations are conceptually the same. This global likelihood 306 can then be used as a single multivariate function to describe the entire NE, which completes the training phase of the algorithm.

p-Value

As new network data is incoming, the pre-built likelihood functions can be used to calculate p-values. These p-values are the ones that quantify how likely or unlikely it is that the given NE is functioning normally. Given a set of PM values xi, the application computes the p-value as:

$$p\text{-value} = \int_x^{max} \text{global likelihood}(x)$$ Eq. (A)

Alternatively, it is also possible to compute individual p-values associated with each individual likelihood, and use Fisher's method to obtain a global p-value per NE, which is summarized by the formula:

$$X_{2N}^2 \cong -2\Sigma_{PM=i}^N \ln(p_i)$$ Eq. (B)

where $p_i$ are the p-values for each of the N uncorrelated PM(i), and where $X_{2N}^2$ is the chi-squared test statistic of dimension 2N. To obtain the global p-value, replace x with $-2\Sigma_{PM=i}^N \ln(p_i)$ and use the $X_{2N}^2$ distribution as the global Likelihood in Eq. (A). These alternative ways of arriving at a unique p-value per NE is what is referred to as dimensionality reduction in FIG. 8.

Summary of the Methods

The steps to arrive at a single p-value per network element thus goes as follows:

(1) Retrieve and store as much PM data as possible from as many NEs as possible. The frequency at which data are collected may change over time without impacting any of the following next steps.

(2) Choose a time frame for which the behavior will be tested. More often than not, this will be the latest data such that the end result will reflect the network's operating status at the present time.

(3) Aggregate identical PM data from identical network elements to build a unique distribution per PM and per network element type.

(4) For each of these distributions (or a combination thereof), remove the data within the chosen time frame and infer its probability density function using a 1-D (or n-D) KDE. In the case of the 1-D KDE, one hence arrives at one PDF per PM and per network element type.

(5) For each group of comparable NEs, compute the correlation matrix between PM metrics.

(6) Using these correlation matrices, obtain the maximal set of uncorrelated metrics.

(7) Per network element, compute a p-value per uncorrelated PM metric using the KDE that belongs to its network element type.

(8) Using Fisher's method, combine each of these p-values to obtain a single p-value per NE.

Typical Use Case Scenario

First, step (1) assumes that all PM data are readily accessible and stored in a data cluster. The data must also be stored in a time-series format, that is, for each data point, an event timestamp is associated with the data, independently of the timestamp associated with the storage location or device (database record time, or similar). This is typical of PM data.

Figure 9:
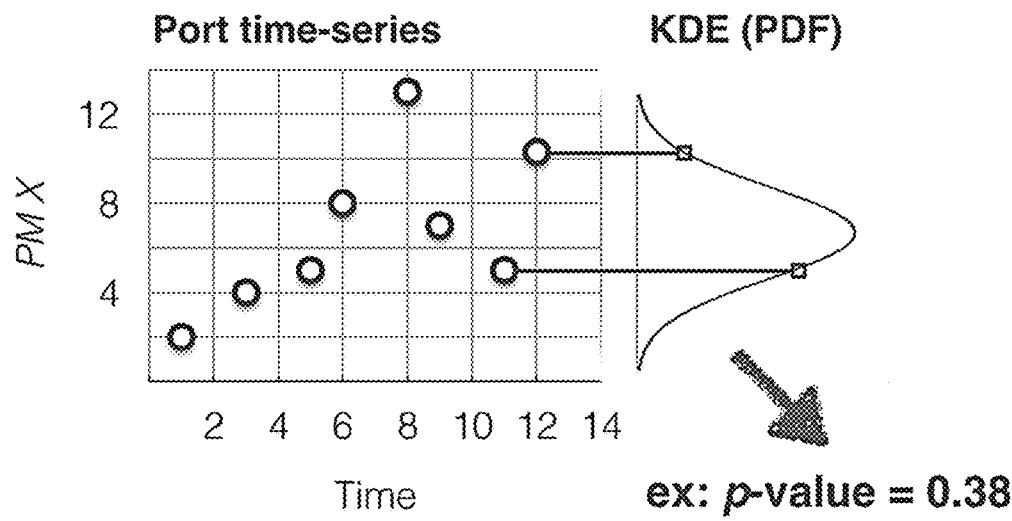
FIG. 9 is a graph of a heuristic representation of PM time-series and its associated Kernel Density Estimates (KDE)

Second, the NE type (often denoted as Product Engineering Code in telecommunications networks) must also be known, permitting the data aggregation of step (3) and with which the KDEs are computed in step (4). FIG. 9 is a graph of a heuristic representation of PM time-series and its associated KDE. It depicts a hypothetical time-series for PM metric X of a particular NE (in this example: a port). It also depicts a KDE that was calculated using the first 6 points on the graph along with the PM X data from all identical port types in the network.

Third, the last two points in the time-series are within the operator's chosen time range in step (2) (for instance: [10, now] using the arbitrary units of FIG. 9). The PDF built upon the available historical values for the PM metric X then allows for the software application to compute the likelihood of these two points as well as the likelihood distribution for obtaining any two PM values. The p-value is then, by definition, the integral of the likelihood distribution from the measured value to infinity. For a given network component, this represents a set of p-values, $\{p_i\}$, as depicted in FIG. 9 for each PM type.

Figure 10:
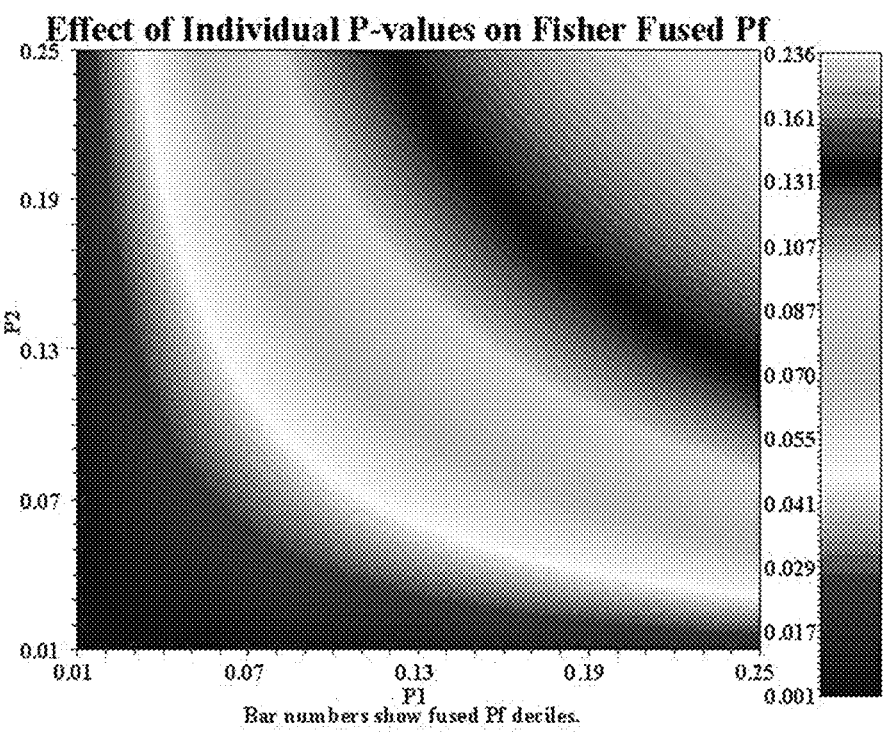
FIG. 10 is a graph showing the outcome of combining 2 p-values using Fisher's method.

In parallel to this, to reduce the set of p-values to a single p-value, it is necessary to compute the correlation matrices between all PMs for each network component type. With that in hand, the maximal set of uncorrelated PMs then allows them to be combined safely using equations (A) and (B). Otherwise, blindly combining p-values from correlated PMs will produce erroneous and unreliable results. Steps (6) and (7) are thus an integral aspect. If the PMs are indeed uncorrelated, the interpretation of their combination could be graphically understood through FIG. 10. FIG. 10 is a graph showing the outcome of combining 2 p-values using Fisher's method.

As one would have naively expected, a combination of 2 low p-values produces an even lower one. Therefore, a single p-value can be obtained per NE that carries information from all PMs at once, as desired. The final result of this approach is, therefore, a set of p-values that can be of importance for network operators by simplifying their decision as to whether a particular network element requires further inspection, or whether it requires preventive replacement.

Deployment

At the end of this process, the KDEs are persisted to a storage unit in order for external programs to use them and compute p-values. Here, it is discussed how KDEs can be effectively deployed to detect abnormal behaviors in live telecommunications networks. As shown in FIG. 1, the anomaly detection application is executed on a computer cluster capable of collecting PM data from a live telecommunications network 120. The machine-learning training typically requires significant data storage and data processing capabilities. However, the simple p-value calculation from a given KDE is a relatively lightweight process. The execution of the software application can be steered from APIs accessible to users, possibly using the REST protocol. An example of such a REST API can include:

Compute the KDE for the given dataset:
URL: GET http://localhost:9000/nhp/kde
Body:

```
{
    "inData": "OpticalDataset",
    "outData": "KDEData",
    "filter": "time < 1479223774 && time > 1479014867"
    "binning": {
       "resolution": 15
       "aggFunction": "avg"
    }
}
```

Get the global probability distribution:
URL: GET http://localhost:9000/nhp/pdf
Body:

```
{
    "inData": "OpticalDataset",
    "outData": "BERData",
    "filter": "time < 1479223774 && time > 1479014867"
    "binning": {
       "resolution": 15
       "aggFunction": "avg"
    }
}
```

Analyze a dataset using the given model:
URL: GET http://localhost:9000/nhp/sml/predict
Body:

```
{
    "inData": "NewOpticalDataset",
    "outData": "PredictedOpticalTSDataset",
    "modelId": 42,
    "threshold": {
       "target": "sensitivity",
       "value": 0.5
    }
    "filter": "time > 1479014867",
}
```

Again, the application can be deployed in different modes:
On-demand: a KDE is computed on a computer, once, for a given network data snapshot;

Batch: PM data is imported to a computer cluster in batch (e.g., once per day or week) and a KDE is computed each time in preparation of new coming data for which the p-values need to be computed;

Streaming: PM data is continuously being ingested by a computer cluster, and the KDE is also continuously being recomputed such that the analysis is done in near real-time; and Embedded: the KDE is embedded in a telecommunications device, data analysis (p-value calculation) is executed in actual real-time directly on the device.

Again, the Embedded mode of operation exploits an interesting feature of machine-learning, namely that it requires Big Data and massive computation power for its training, but only minimal CPU and data for its execution. Furthermore, once the KDE is persisted to a storage unit, it becomes easy to decouple its computation from the computation of the p-values. Hence it is conceivable that ML training could happen on a multi-CPU computer cluster, but classifier execution happens on a small single CPU device (such as a telecommunications device, for instance).

In either of the above modes, the system 100 can be used to detect a wide range of problems, as long as KDEs are computed using relevant datasets, and p-value calculations are done on data that are similar to the datasets that were used to compute the KDEs.

Network Deployment

Figure 11:
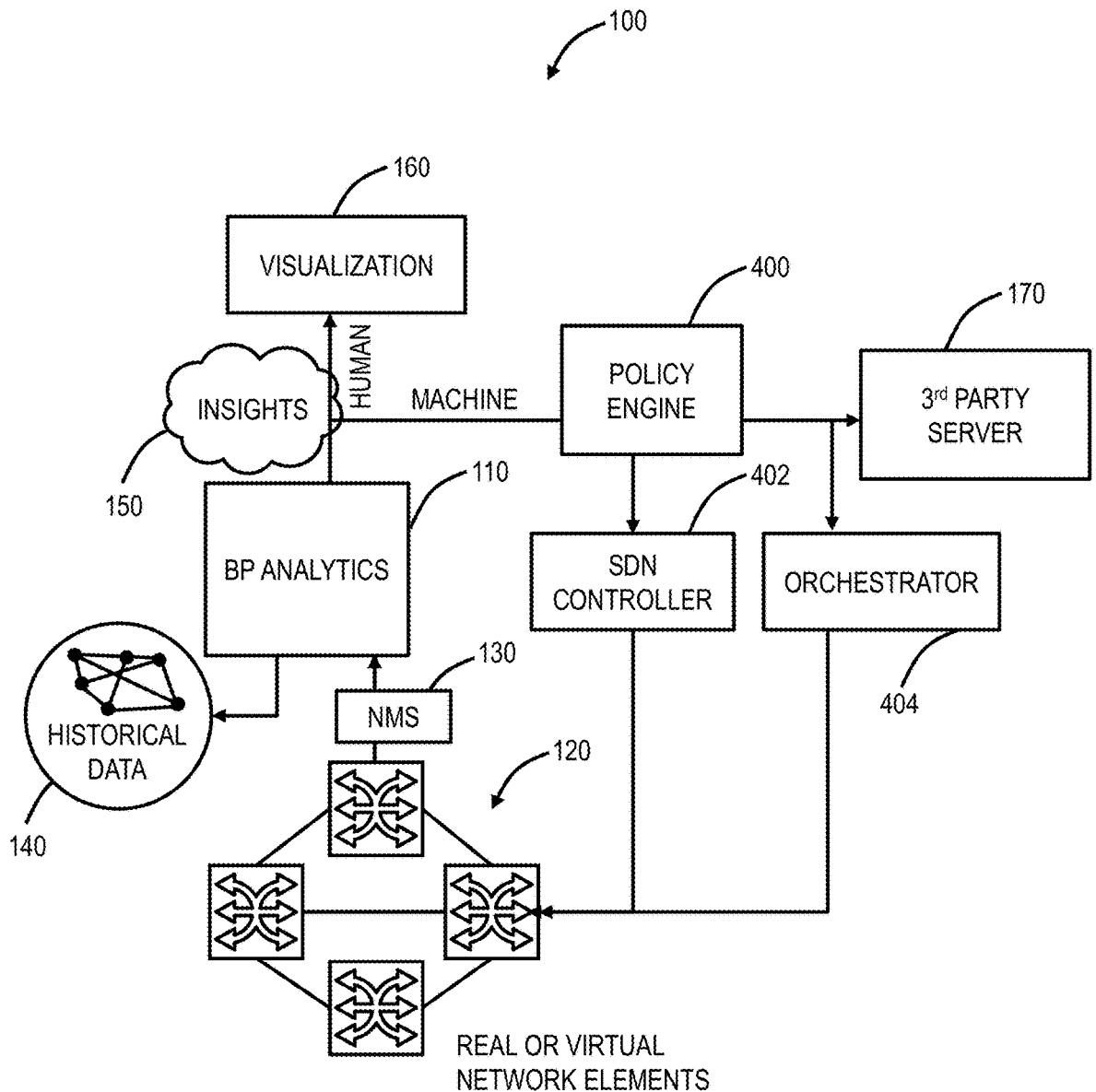
FIG. 11 is a network diagram of the system of FIG. 1 with the anomaly detection software coupled to a policy engine, a Software Defined Networking (SDN) controller, and an orchestrator.

FIG. 11 is a network diagram of the system 100 with the anomaly detection software coupled to a policy engine 400, a Software Defined Networking (SDN) controller 402, and an orchestrator 404. Here, the actionable insights 150 can be used to cause actions in the network 120 automatically.

Figure 12:
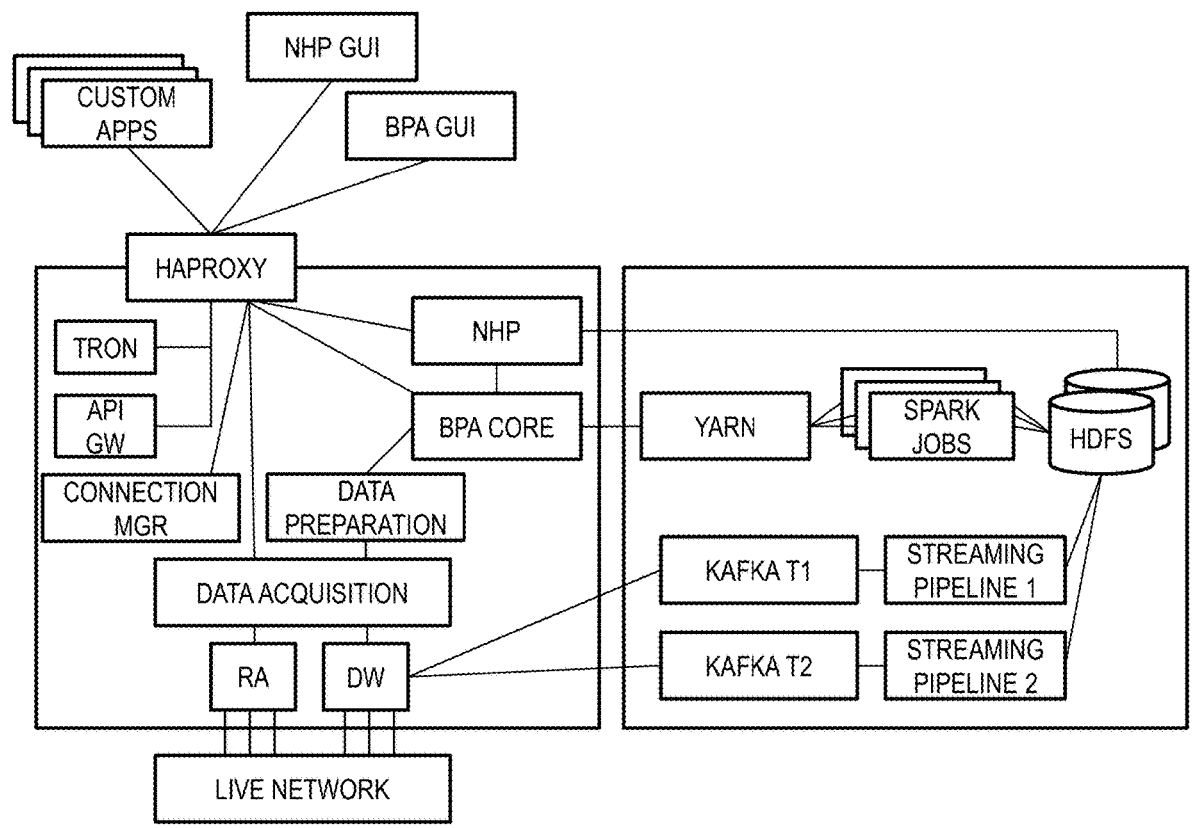
FIG. 12 is a network diagram of an example implementation of the system of FIG. 1.
Figure 13:
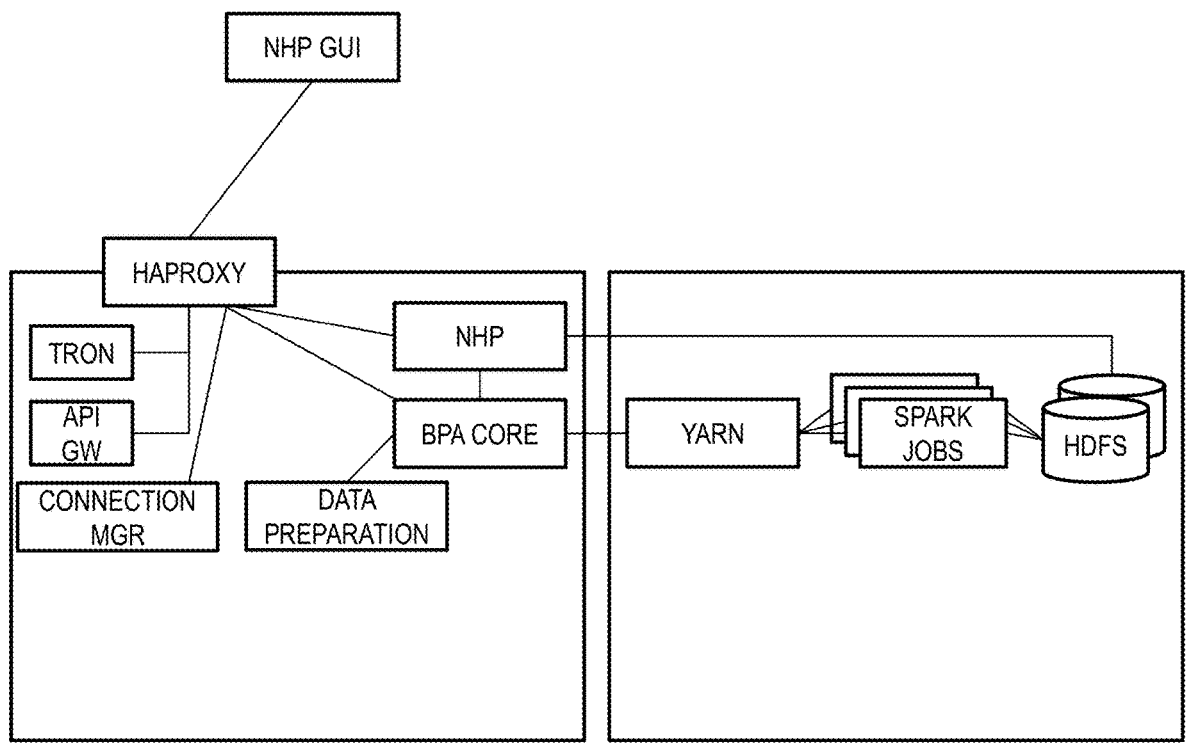
FIG. 13 is a network diagram of an example implementation of a network health predictor.

FIG. 12 is a network diagram of an example implementation of the system 100. FIG. 13 is a network diagram of an example implementation of a network health predictor.

Figure 14:
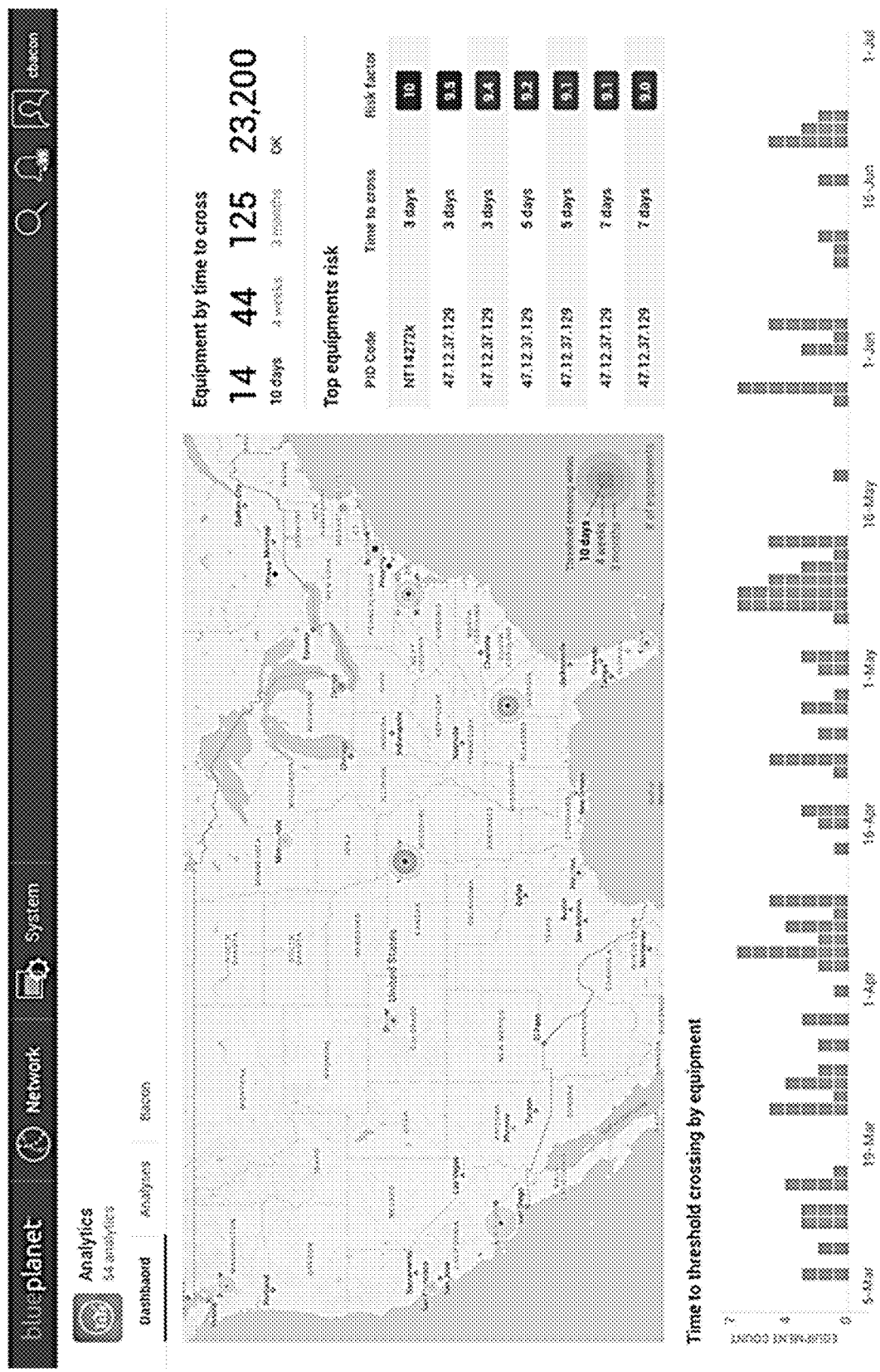
FIG. 14 is a Graphical User Interface (GUI) of a network health predictor dashboard.

FIG. 14 is a Graphical User Interface (GUI) of a network health predictor dashboard. As illustrated in FIG. 14, the system 100 can display a map in the dashboard with highlights, colors, or other visual indicators to show NE health. The dashboard can further display a time graph of threshold crossings over time as well as a summary of the number of devices being monitored and a list of the top equipment at risk. The summary shows in a network of 23,200 devices, 14 have crossed thresholds in the last 10 days, 44 in the last 4 weeks and 125 in the last 3 months. Again, the devices here are individual modules or cards, not entire NEs. With this data, the operator can replace the top equipment at risk as an actionable item. If the new equipment also exhibits risk, the operator knows there are other problems. If the new equipment does not show the risk, then the system 100 leads to proactive maintenance that prevented a possible fault in the future leading to a traffic hit or loss. In this manner, the system 100 provides enhanced system availability and reduces outages.

Server

Figure 15:
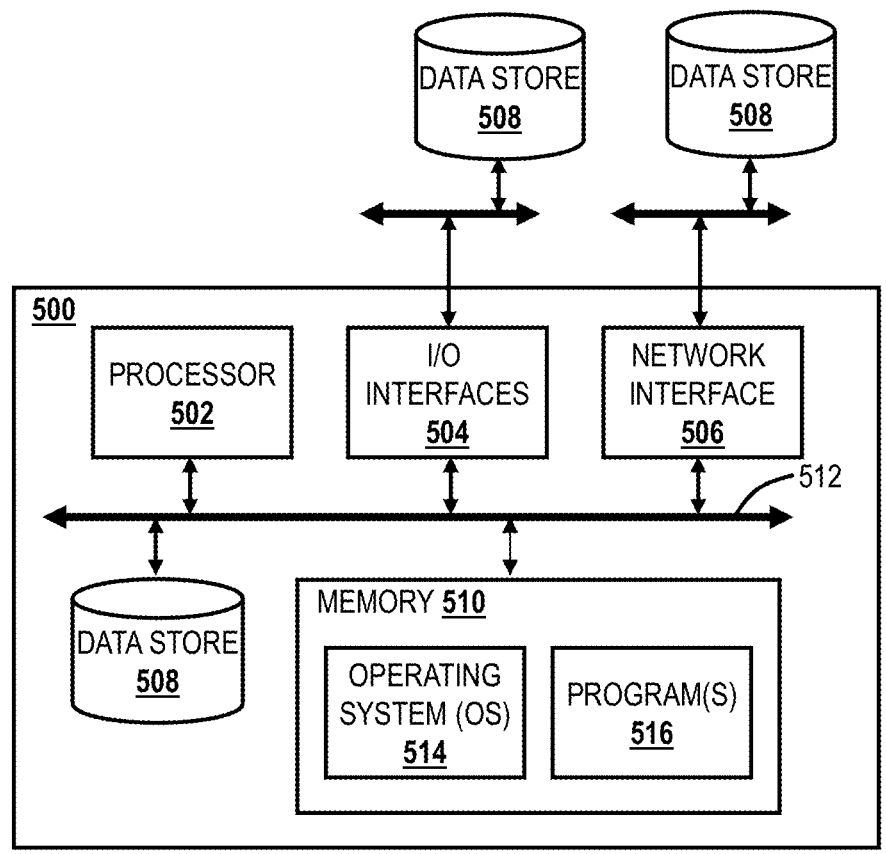
FIG. 15 is a schematic diagram of a server for use with the systems and methods described herein.

FIG. 15 is a block diagram of a server 500 which may be used to implement a server in the computer cluster 100, etc. The server 500 can implement the various processes associated with the systems and methods described herein. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 15 depicts the server 500 in an oversimplified manner, and practical embodiments may include additional components and suitably configured processing logic to support known or conventional operating features that are not described in detail herein. The components (502, 504, 506, 508, and 510) are communicatively coupled via a local interface 512. The local interface 512 may be, for example, but not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chip set), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate over a network, such as the Internet, a wide area network (WAN), a local area network (LAN), and the like, etc. The network interface 506 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n/ac). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500 such as, for example, an internal hard drive connected to the local interface 512 in the server 500. Additionally, in another embodiment, the data store 508 may be located external to the server 500 such as, for example, an external hard drive connected to the I/O interfaces 504 (e.g., SCSI or USB connection). In a further embodiment, the data store 508 may be connected to the server 500 through a network, such as, for example, a network attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

In an embodiment, the server 500 is configured to detect abnormal behavior in a network. The server 500 includes the processor 502 and the memory 510 storing instructions that, when executed, cause the processor 502 to obtain Performance Monitoring (PM) data including one or more of production PM data, lab PM data, and simulated PM data; determine a model based on training with the PM data for machine learning; receive live PM data from the network; utilize the live PM data with the model to detect an anomaly in the network; and cause an action to address the anomaly. The live PM data and the PM data can be associated with any of an optical layer, a Time Division Multiplexing (TDM) layer, and a packet layer. The action can include one or more of a notification to a network operator, a replacement of a network device associated with the anomaly, and configuration changes of the network device associated with the anomaly. The PM data can be labeled prior to the training to at least differentiate between normal PM data and anomalous PM data. The PM data can be unlabeled prior to the training, and the corresponding model provides a single probability output of the anomaly based on the live PM data.

In another embodiment, a non-transitory computer-readable medium such as the data store 508 or the memory 510 includes instructions that, when executed, cause a processor 502 to perform the steps of obtaining Performance Monitoring (PM) data including one or more of production PM data, lab PM data, and simulated PM data; determining a model based on training with the PM data for machine learning; receiving live PM data from the network; utilizing the live PM data with the model to detect an anomaly in the network; and causing an action to address the anomaly.

Process to Detect Abnormal Behavior in a Network

Figure 16:
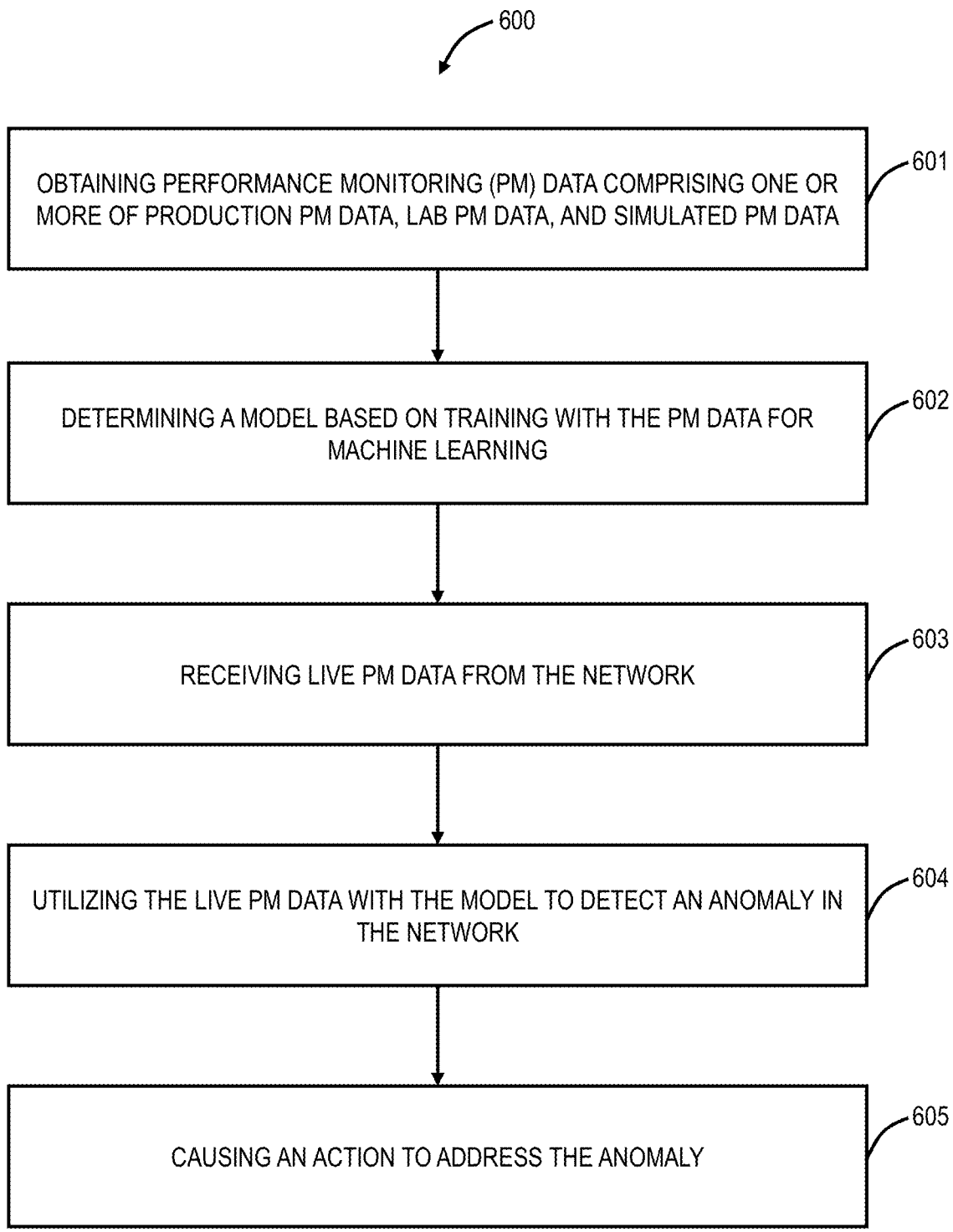
FIG. 16 is a schematic flow diagram representative of a process implementing the systems and methods described herein.

FIG. 16 is a flowchart of a process 600 implemented by a computer to detect abnormal behavior in a network. The process includes 600 obtaining Performance Monitoring (PM) data including one or more of production PM data, lab PM data, and simulated PM data (step 601); determining a model based on training with the PM data for machine learning (step 602); receiving live PM data from the network (step 603); utilizing the live PM data with the model to detect an anomaly in the network (step 604); and causing an action to address the anomaly (step 605). The obtaining and the determining can be performed offline, and the receiving, the utilizing, and the causing can be performed in real-time with the live PM data. The live PM data and the PM data can be associated with any of an optical layer, a Time Division Multiplexing (TDM) layer, and a packet layer. The production PM data can come from actual, live networks. The lab PM data is from actual networks such as testbed or lab networks, and the simulated PM data is generated for the purpose of training, i.e., this is not from actual networks.

The action can include one or more of a notification to a network operator, a replacement of a network device associated with the anomaly, and configuration changes of the network device associated with the anomaly. For example, the network device can be a particular module or card which is replaced with a spare based on the anomaly. The configuration changes can include, for example, increasing optical margin or FEC at the optical layer based on the anomaly.

The configuration change can also include, for example, rerouting TDM or packet services away from a troubled node. Various other embodiments are contemplated to address the anomaly.

The PM data can be labeled prior to the training to at least differentiate between normal PM data and anomalous PM data. The training can utilize the labeled PM data to build one or more classifiers to recognize the anomaly. The training can utilize the labeled PM data to build a plurality of classifiers with multiple intermediate classifiers, and a final classifier as a combination of the multiple intermediate classifiers, and wherein the final classifier is configured to recognize the anomaly and a type of the anomaly. The training can further include adjusting a threshold of the model to adjust precision and sensitivity of the model. The labeled PM data can utilize the simulated PM data with additional labels for a root cause of the anomaly.

The PM data can be unlabeled prior to the training, and the corresponding model provides a single probability output of the anomaly based on the live PM data. The PM data can be representative of a normally functioning network such that the single probability output provides an indication of a departure from the normally functioning network. The single probability output can be a p-value from multiple different PM types. The training can build a set of Probability Density Functions (PDFs) from the PM data, builds a likelihood function for each PDF, and builds a global likelihood function based on a product of each individual likelihood function, and wherein the global likelihood function is a single multivariate function to describe a network component. The global likelihood function can be used to calculate a p-value, and the anomaly is detected based on the p-value.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method implemented by a computer to detect abnormal behavior in a network, the method comprising:
   obtaining Performance Monitoring (PM) data that represents normal behavior of network elements in the network under normal conditions, the PM data comprising one or more of optical layer data, packet layer data, service or traffic layer data, and hardware operating metrics, wherein the PM data for comparable network elements at any of an optical layer, time division multiplexing layer, packet layer, and combinations thereof, that are identical in type and usage, is aggregated into a unique probability density function;
   determining a baseline model of normal behavior based on machine learning training of the PM data including one or more unique probability density functions;
   receiving live PM data that represents live behavior of the network elements in the network;
   utilizing the live PM data with the baseline model to detect an anomaly or abnormal behavior of one or more of the network elements in the network; and
   causing an action to address the anomaly or abnormal behavior of the one or more of the network elements;
   wherein the action comprises one or more of a replacement of the one or more network elements associated with the anomaly or abnormal behavior and a configuration change of the one or more network elements associated with the anomaly or abnormal behavior.

2. The method of claim 1, wherein the obtaining and the determining are performed offline, and the receiving, the utilizing, and the causing are performed in real-time with the live PM data.

3. The method of claim 1, wherein the live PM data and the PM data are associated with the behavior of the network elements operating on any of an optical layer, a Time Division Multiplexing (TDM) layer, and a packet layer.

4. The method of claim 1, wherein the action further comprises a notification to a network operator.

5. The method of claim 1, wherein the PM data is labeled prior to the training to differentiate between various root causes related to different anomalies.

6. The method of claim 1, wherein the PM data is labeled prior to the training to at least differentiate between normal PM data and anomalous PM data.

7. The method of claim 6, wherein the training utilizes the labeled PM data and supervised learning to build one or more classifiers to recognize the anomaly.

8. The method of claim 6, wherein the training utilizes the labeled PM data to build a plurality of classifiers with multiple intermediate classifiers and a final classifier as a combination of the multiple intermediate classifiers, and wherein the final classifier is configured to recognize the anomaly and a type of the anomaly.

9. The method of claim 6, wherein the training further comprises adjusting a threshold of the baseline model to adjust precision and sensitivity of the baseline model.

10. The method of claim 6, wherein the labeled PM data utilizes the simulated PM data with additional labels for a root cause of the anomaly.

11. The method of claim 5, wherein the training utilizes the labeled PM data and supervised machine learning to build one or more classifiers to recognize various root causes associated with each label.

12. The method of claim 1, wherein the PM data is unlabeled prior to the training, and the corresponding model provides a single probability output of the anomaly based on the live PM data.

13. The method of claim 12, wherein the PM data is representative of a normally functioning network such that the single probability output provides an indication of a departure from the normally functioning network.

14. The method of claim 12, wherein the single probability output is a p-value from multiple different PM types.

15. The method of claim 12, wherein the training builds a set of Probability Density Functions (PDFs) from the PM data, builds a likelihood function for each PDF, and builds a global likelihood function based on a product of each individual likelihood function, and wherein the global likelihood function is a single multivariate function to describe a network component.

16. The method of claim 15, wherein the global likelihood function is used to calculate a p-value and the anomaly is detected based on the p-value.

17. An apparatus configured to detect abnormal behavior in a network, the apparatus comprising:
a processor; and
memory storing instructions that, when executed, cause the processor to
obtain Performance Monitoring (PM) data that represents normal behavior of network elements in the network under normal conditions, the PM data comprising one or more of optical layer data, packet layer data, service or traffic layer data, and hardware operating metrics, wherein the PM data for comparable network elements at any of an optical layer, time division multiplexing layer, packet layer and combinations thereof, that are identical in type and usage, is aggregated into a unique probability density function,
determine a baseline model of normal behavior based on machine learning training of the PM data including one or more unique probability density functions;
receive live PM data that represents live behavior of the network elements in the network,
utilize the live PM data with the baseline model to detect an anomaly or abnormal behavior of one or more of the network elements in the network, and
cause an action to address the anomaly or abnormal behavior of the one or more of the network elements;
wherein the action comprises one or more of a replacement of the one or more network elements associated with the anomaly or abnormal behavior and a configuration change of the one or more network elements associated with the anomaly or abnormal behavior.

18. The apparatus of claim 17, wherein the live PM data and the PM data are associated with the behavior of the network elements operating on any of an optical layer, a Time Division Multiplexing (TDM) layer, and a packet layer.

19. The apparatus of claim 17, wherein the action further comprises a notification to a network operator.

20. A non-transitory computer-readable medium comprising instructions that, when executed, cause a processor to perform the steps of:
obtaining Performance Monitoring (PM) data that represents normal behavior of network elements in a network under normal conditions, the PM data comprising one or more of optical layer data, packet layer data, service or traffic layer data, and hardware operating metrics, wherein the PM data for comparable network elements at any of an optical layer, time division multiplexing layer, packet layer, and combinations thereof, that are identical in type and usage, is aggregated into a unique probability density function;
determining a baseline model or normal behavior based on machine learning training of the PM data including one or more unique probability density functions;
receiving live PM data that represents live behavior of the network elements in the network;
utilizing the live PM data with the baseline model to detect an anomaly or abnormal behavior of one or more of the network elements in the network; and
causing an action to address the anomaly or abnormal behavior of the one or more of the network elements;
wherein the action comprises one or more of a replacement of the one or more network elements associated with the anomaly or abnormal behavior and a configuration change of the one or more network elements associated with the anomaly or abnormal behavior.

* * * * *